US012728508B2

(12) United States Patent
Temme et al.

(10) Patent No.: US 12,728,508 B2
(45) Date of Patent: Sep. 8, 2026

(54) ROUTER

(71) Applicant: MILWAUKEE ELECTRIC TOOL CORPORATION, Brookfield, WI (US)

(72) Inventors: Connor M. Temme, Medford, WI (US); Nikos A. Gainacopulos, Milwaukee, WI (US); Andrew R. Schauer, Pewaukee, WI (US)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 251 days.

(21) Appl. No.: 18/694,102

(22) PCT Filed: Sep. 27, 2022

(86) PCT No.: PCT/US2022/044856

§ 371 (c)(1),
(2) Date: Mar. 21, 2024

(87) PCT Pub. No.: WO2023/055724

PCT Pub. Date: Apr. 6, 2023

(65) Prior Publication Data

US 2025/0135616 A1 May 1, 2025

Related U.S. Application Data

(60) Provisional application No. 63/249,941, filed on Sep. 29, 2021.

(51) Int. Cl.
*B25C 5/10* (2006.01)
*B25F 5/00* (2006.01)

(52) U.S. Cl.
CPC ................ *B25C 5/10* (2013.01); *B25F 5/006* (2013.01)

(58) Field of Classification Search
CPC ... B27C 5/10; B25C 5/10; B25F 5/006; B23C 2255/00
See application file for complete search history.

(56) References Cited

U.S. PATENT DOCUMENTS 1,649,060 A 11/1927 Decker
1,706,157 A 3/1929 Hannah
(Continued)

FOREIGN PATENT DOCUMENTS

CN 2858198 Y 1/2007
CN 103506923 A 1/2014
(Continued)

OTHER PUBLICATIONS

Robert Bosch Tool Corporation, "PR10E, PR20E," Operating/Safety Instructions ©2012 (84 pages).
(Continued)

*Primary Examiner* — Mohammed S. Alawadi
(74) *Attorney, Agent, or Firm* — Michael Best & Friedrich LLP

(57) ABSTRACT

A router includes a motor unit including an electric motor and a rotatable output shaft. The router also includes a base plate coupled to the motor unit, and a depth adjustment mechanism configured to adjust a position of the motor unit relative to the base plate. The depth adjustment mechanism includes a threaded depth adjustment shaft rotatably coupled to one of the motor unit and the base plate and translationally affixed thereto. The depth adjustment mechanism also includes a micro depth adjustment shaft rotatably coupled to the other of the motor unit and the base plate and translationally affixed thereto, the micro depth adjustment shaft being received into a keyed bore defined in the threaded depth adjustment shaft in a telescoping arrangement. Rotation of the micro depth adjustment shaft rotates the threaded
(Continued)

depth adjustment shaft to effect movement of the motor unit relative to the base plate.

20 Claims, 17 Drawing Sheets

(56) References Cited

U.S. PATENT DOCUMENTS

| | | | |
|---|---|---|---|
| 1,805,164 | A | 5/1931 | Carter |
| 2,527,968 | A | 10/1950 | Sherman et al. |
| 2,897,302 | A | 7/1959 | Godfrey et al. |
| 3,454,061 | A | 7/1969 | Cordone et al. |
| 3,494,394 | A | 2/1970 | Stock |
| 3,494,395 | A | 2/1970 | Graham |
| 3,511,947 | A | 5/1970 | Eikermann et al. |
| 3,791,260 | A | 2/1974 | Ambler et al. |
| 4,239,428 | A | 12/1980 | Berzina |
| 4,400,995 | A | 8/1983 | Palm |
| 4,562,872 | A | 1/1986 | Fushiya et al. |
| 4,770,573 | A | 9/1988 | Monobe |
| 4,938,264 | A | 7/1990 | Ferenczffy |
| 5,013,195 | A | 5/1991 | Strazar |
| 5,013,196 | A | 5/1991 | Friegang |
| 5,022,188 | A | 6/1991 | Borst |
| 5,094,575 | A | 3/1992 | Kieser et al. |
| 5,143,494 | A | 9/1992 | McCurry |
| 5,191,921 | A | 3/1993 | McCurry |
| 5,191,968 | A | 3/1993 | McCurry |
| 5,273,089 | A | 12/1993 | Fuchs et al. |
| 5,320,463 | A | 6/1994 | McCurry et al. |
| 5,346,342 | A | 9/1994 | Winchester |
| 5,353,852 | A | 10/1994 | Stolzer et al. |
| 5,590,988 | A | 1/1997 | Rusconi |
| 5,590,989 | A | 1/1997 | Mulvihill |
| 5,671,789 | A | 9/1997 | Stolzer et al. |
| 5,766,062 | A | 6/1998 | Edling |
| 5,902,080 | A | 5/1999 | Kopras |
| 6,065,912 | A | 5/2000 | Bosten et al. |
| 6,079,915 | A | 6/2000 | Bosten et al. |
| 6,139,229 | A | 10/2000 | Bosten et al. |
| 6,261,036 | B1 | 7/2001 | Bosten et al. |
| 6,266,850 | B1 | 7/2001 | Williams et al. |
| 6,350,087 | B1 | 2/2002 | Berry et al. |
| 6,488,455 | B1 | 12/2002 | Staebler et al. |
| 6,558,090 | B2 | 5/2003 | Lagaly et al. |
| 6,558,091 | B2 | 5/2003 | Smith et al. |
| 6,568,887 | B2 | 5/2003 | Hathcock et al. |
| 6,619,894 | B2 | 9/2003 | Hathcock et al. |
| 6,648,567 | B2 | 11/2003 | Berry et al. |
| 6,726,414 | B2 | 4/2004 | Pientka et al. |
| 6,896,451 | B2 | 5/2005 | Oberheim |
| 6,948,892 | B2 | 9/2005 | Hummel |
| 6,986,369 | B1 | 1/2006 | Cooper et al. |
| 7,052,384 | B2 | 5/2006 | Wolf et al. |
| 7,064,462 | B2 | 6/2006 | Hempe et al. |
| 7,073,993 | B2 | 7/2006 | Cooper et al. |
| 7,089,979 | B2 | 8/2006 | Cooper et al. |
| 7,108,464 | B2 | 9/2006 | Cooper et al. |
| 7,264,429 | B2 | 9/2007 | Miller |
| 7,275,900 | B1 | 10/2007 | Phillips et al. |
| 7,290,575 | B2 | 11/2007 | Freese et al. |
| 7,303,364 | B2 | 12/2007 | Cooper et al. |
| 7,316,528 | B2 | 1/2008 | Cooper et al. |
| 7,334,613 | B2 | 2/2008 | Griffin et al. |
| 7,334,614 | B2 | 2/2008 | Cooper et al. |
| 7,402,008 | B2 | 7/2008 | Phillips et al. |
| 7,424,768 | B2 | 9/2008 | Beruscha et al. |
| 7,438,095 | B2 | 10/2008 | Hessenberger et al. |
| 7,451,791 | B2 | 11/2008 | Cooper et al. |
| 7,455,488 | B2 | 11/2008 | Carlson et al. |
| 7,473,058 | B2 | 1/2009 | Zhu |
| 7,490,642 | B1 | 2/2009 | Cooper et al. |
| 7,521,826 | B2 | 4/2009 | Hempe et al. |
| 7,524,151 | B2 | 4/2009 | Zhu |
| 7,559,347 | B2 * | 7/2009 | Hummel .................. B27C 5/10 409/206 |
| 7,578,325 | B2 | 8/2009 | Freese et al. |
| 7,637,294 | B2 | 12/2009 | Hessenberger et al. |
| 7,654,294 | B2 | 2/2010 | Cooper et al. |
| 7,686,046 | B2 | 3/2010 | Griffin et al. |
| 7,871,227 | B2 | 1/2011 | Adamczak et al. |
| 7,900,661 | B2 | 3/2011 | Thorson et al. |
| 7,931,054 | B2 | 4/2011 | Pozgay et al. |
| 7,950,882 | B2 | 5/2011 | Zaiser et al. |
| 7,975,737 | B2 | 7/2011 | Griffin et al. |
| 7,980,325 | B2 | 7/2011 | Botefuhr et al. |
| 7,984,734 | B2 | 7/2011 | Cepress et al. |
| 8,047,242 | B2 | 11/2011 | Wall et al. |
| 8,066,041 | B2 | 11/2011 | Pozgay et al. |
| 8,136,558 | B2 | 3/2012 | Pozgay et al. |
| 8,192,254 | B2 | 6/2012 | Fukinuki et al. |
| 8,393,835 | B2 | 3/2013 | Wasielewski |
| 8,513,838 | B2 | 8/2013 | Toukairin et al. |
| 8,545,143 | B2 | 10/2013 | Liu |
| 8,607,833 | B2 | 12/2013 | Pozgay et al. |
| 8,627,900 | B2 | 1/2014 | Oomori et al. |
| 8,810,085 | B2 | 8/2014 | Matsunaga et al. |
| 8,816,544 | B2 | 8/2014 | Tanimoto et al. |
| 9,061,393 | B2 | 6/2015 | Sugita et al. |
| 9,079,291 | B2 | 7/2015 | Ikuta et al. |
| 9,114,500 | B2 | 8/2015 | Sugita et al. |
| 9,144,919 | B2 | 9/2015 | Cui et al. |
| 9,154,009 | B2 | 10/2015 | Alemu |
| 9,289,832 | B2 | 3/2016 | Kishima et al. |
| 9,314,900 | B2 | 4/2016 | Vanko et al. |
| 9,318,932 | B2 | 4/2016 | Purohit et al. |
| 9,346,144 | B2 | 5/2016 | Tan |
| 9,406,915 | B2 | 8/2016 | White et al. |
| 9,450,471 | B2 | 9/2016 | Mergener et al. |
| 9,450,472 | B2 | 9/2016 | Hatfield et al. |
| 9,457,459 | B2 | 10/2016 | Tadokoro et al. |
| 9,525,326 | B2 | 12/2016 | Chen et al. |
| 9,527,200 | B2 | 12/2016 | Okouchi et al. |
| 9,539,649 | B2 | 1/2017 | Nishikawa et al. |
| 9,561,548 | B2 | 2/2017 | Kishima et al. |
| 9,583,745 | B2 | 2/2017 | White et al. |
| 9,583,793 | B2 | 2/2017 | White et al. |
| 9,590,475 | B2 | 3/2017 | Oomori et al. |
| 9,621,009 | B2 | 4/2017 | Matsunaga et al. |
| 9,669,534 | B2 | 6/2017 | Okouchi et al. |
| 9,724,815 | B2 | 8/2017 | Zhen et al. |
| 9,762,153 | B2 | 9/2017 | Forster et al. |
| 9,774,229 | B1 | 9/2017 | Mergener et al. |
| 9,787,159 | B2 | 10/2017 | Beyerl |
| 9,812,930 | B2 | 11/2017 | Purohit et al. |
| 9,819,241 | B2 | 11/2017 | Smith et al. |
| 9,844,849 | B2 | 12/2017 | Hayashi et al. |
| 9,855,649 | B2 | 1/2018 | Schnell et al. |
| 9,871,484 | B2 | 1/2018 | White et al. |
| 9,893,384 | B2 | 2/2018 | Velderman et al. |
| 9,954,417 | B2 | 4/2018 | Mergener et al. |
| 9,960,656 | B2 | 5/2018 | Mergener et al. |
| 10,027,201 | B2 | 7/2018 | Hara et al. |
| 10,050,572 | B2 | 8/2018 | Pant et al. |
| 10,056,582 | B2 | 8/2018 | White et al. |
| 10,056,806 | B2 | 8/2018 | Hatfield et al. |
| 10,128,723 | B2 | 11/2018 | Mergener et al. |
| 10,177,701 | B2 | 1/2019 | White et al. |
| 10,193,111 | B2 | 1/2019 | Varipatis et al. |
| 10,193,422 | B2 | 1/2019 | Kouda et al. |
| 10,207,399 | B2 | 2/2019 | Okouchi et al. |
| 10,226,849 | B2 | 3/2019 | Privett, Jr. et al. |
| 10,236,819 | B2 | 3/2019 | White et al. |
| 10,243,491 | B2 | 3/2019 | Cox et al. |
| 10,250,178 | B2 | 4/2019 | White et al. |
| 10,272,550 | B2 | 4/2019 | Dey, IV et al. |
| 10,272,558 | B2 | 4/2019 | Christophersen et al. |
| 10,286,529 | B2 | 5/2019 | Kiyohara et al. |
| 10,291,173 | B2 | 5/2019 | Cox et al. |
| 10,298,098 | B2 | 5/2019 | Niwa |
| 10,328,566 | B2 | 6/2019 | Crosby et al. |
| 10,328,567 | B2 | 6/2019 | Oktavec et al. |
| 10,333,453 | B2 | 6/2019 | Forster et al. |

(56) References Cited

U.S. PATENT DOCUMENTS

| | | | | |
|---|---|---|---|---|
| 10,333,454 | B2 | 6/2019 | Forster et al. | |
| 10,348,158 | B2 | 7/2019 | Niwa et al. | |
| 10,348,159 | B2 | 7/2019 | Beyerl | |
| 10,361,651 | B2 | 7/2019 | White et al. | |
| 10,391,667 | B2 | 8/2019 | Staeubli et al. | |
| 10,404,136 | B2 | 9/2019 | Oktavec et al. | |
| 10,411,558 | B2 | 9/2019 | Forster et al. | |
| 10,469,006 | B2 | 11/2019 | Pant et al. | |
| 10,478,950 | B2 | 11/2019 | Nagasaka et al. | |
| 10,498,195 | B2 | 12/2019 | Mergener et al. | |
| 10,500,708 | B2 | 12/2019 | Kelleher et al. | |
| 10,511,208 | B2 | 12/2019 | Hara et al. | |
| 10,518,343 | B2 | 12/2019 | Ogino et al. | |
| 10,523,080 | B2 | 12/2019 | Smith et al. | |
| 10,530,220 | B2 | 1/2020 | Mergener et al. | |
| 10,541,639 | B2 | 1/2020 | White et al. | |
| 10,583,545 | B2 | 3/2020 | Dey, IV et al. | |
| 10,594,813 | B1 | 3/2020 | Koehler et al. | |
| 10,596,679 | B2 | 3/2020 | Takeda et al. | |
| 10,601,266 | B2 | 3/2020 | Chang et al. | |
| 10,608,574 | B2 | 3/2020 | White et al. | |
| 10,615,733 | B2 | 4/2020 | Cox et al. | |
| 10,618,157 | B2 | 4/2020 | Hashimoto et al. | |
| 10,632,589 | B2 | 4/2020 | Fisher et al. | |
| 10,658,903 | B2 | 5/2020 | Forster et al. | |
| 10,658,957 | B2 | 5/2020 | Kuragano et al. | |
| 10,693,345 | B2 | 6/2020 | Beyerl | |
| 10,786,894 | B2 | 9/2020 | Coates et al. | |
| 10,792,780 | B2 | 10/2020 | Masatoshi et al. | |
| 10,821,591 | B2 | 11/2020 | Verbrugge et al. | |
| 10,840,559 | B2 | 11/2020 | Velderman et al. | |
| 10,848,084 | B2 | 11/2020 | Nieh et al. | |
| 10,882,123 | B2 | 1/2021 | Brewster et al. | |
| 10,906,163 | B2 | 2/2021 | Nagasaka et al. | |
| 2004/0035495 | A1 | 2/2004 | Hessenberger et al. | |
| 2004/0194854 | A1* | 10/2004 | McDonald .............. | B25F 5/003<br>144/136.95 |
| 2005/0034782 | A1 | 2/2005 | Park et al. | |
| 2006/0102249 | A1 | 5/2006 | Cooper et al. | |
| 2006/0191597 | A1 | 8/2006 | Cooper et al. | |
| 2007/0284890 | A1 | 12/2007 | Guido | |
| 2008/0014844 | A1 | 1/2008 | Pontieri | |
| 2008/0283147 | A1 | 11/2008 | Cooper et al. | |
| 2009/0050236 | A1* | 2/2009 | Thorson ............... | B23Q 16/001<br>144/135.2 |
| 2009/0114312 | A1 | 5/2009 | Cooper et al. | |
| 2010/0253162 | A1 | 10/2010 | Sakamaki et al. | |
| 2011/0094762 | A1 | 4/2011 | Liebhard | |
| 2011/0214546 | A1 | 9/2011 | Inayoshi et al. | |
| 2012/0017448 | A1 | 1/2012 | Dreher | |
| 2012/0241047 | A1 | 9/2012 | Kato et al. | |
| 2013/0342041 | A1 | 12/2013 | Ayers et al. | |
| 2015/0183106 | A1 | 7/2015 | Schnell et al. | |
| 2016/0111984 | A1 | 4/2016 | Koizumi et al. | |
| 2017/0106520 | A1 | 4/2017 | Schadow et al. | |
| 2017/0126051 | A1 | 5/2017 | Cox et al. | |
| 2017/0129129 | A1 | 5/2017 | Simm | |
| 2017/0234484 | A1 | 8/2017 | Vanko et al. | |
| 2017/0239804 | A1 | 8/2017 | Matsushita et al. | |
| 2017/0246735 | A1 | 8/2017 | Hashimoto et al. | |
| 2017/0338753 | A1 | 11/2017 | Forster et al. | |
| 2018/0034346 | A1 | 2/2018 | Purohit et al. | |
| 2018/0090979 | A1 | 3/2018 | Forster et al. | |
| 2018/0248446 | A1 | 8/2018 | Mergener et al. | |
| 2018/0248507 | A1 | 8/2018 | Vanko et al. | |
| 2018/0294688 | A1 | 10/2018 | Smith et al. | |
| 2018/0323681 | A1 | 11/2018 | Hatfield et al. | |
| 2019/0044415 | A1 | 2/2019 | Hatfield et al. | |
| 2019/0076940 | A1 | 3/2019 | Crabb et al. | |
| 2019/0091779 | A1 | 3/2019 | Crabb et al. | |
| 2019/0152014 | A1 | 5/2019 | Privett et al. | |
| 2019/0224819 | A1 | 7/2019 | Kiyohara et al. | |
| 2019/0280560 | A1 | 9/2019 | Niwa et al. | |
| 2019/0291260 | A1 | 9/2019 | Gainacopulos et al. | |
| 2019/0329440 | A1 | 10/2019 | Staeubli et al. | |
| 2019/0329441 | A1* | 10/2019 | Kuehn ...................... | B27C 5/10 |
| 2019/0341872 | A1 | 11/2019 | Cox et al. | |
| 2019/0341873 | A1 | 11/2019 | Cox et al. | |
| 2019/0358769 | A1 | 11/2019 | Miyazawa et al. | |
| 2019/0379258 | A1 | 12/2019 | Hon | |
| 2020/0016734 | A1 | 1/2020 | Kelleher et al. | |
| 2020/0036307 | A1 | 1/2020 | Pant | |
| 2020/0036308 | A1 | 1/2020 | Pant | |
| 2020/0052551 | A1 | 2/2020 | Hara et al. | |
| 2020/0052559 | A1 | 2/2020 | Matsushita et al. | |
| 2020/0086405 | A1 | 3/2020 | Ogino et al. | |
| 2020/0091793 | A1 | 3/2020 | Smith et al. | |
| 2020/0101587 | A1 | 4/2020 | Niwa | |
| 2020/0112231 | A1 | 4/2020 | Hatfield et al. | |
| 2020/0114499 | A1 | 4/2020 | Vanko et al. | |
| 2020/0162011 | A1 | 5/2020 | Cox et al. | |
| 2020/0171632 | A1 | 6/2020 | Dey, IV et al. | |
| 2020/0177047 | A1 | 6/2020 | Kutsuna | |
| 2020/0186006 | A1 | 6/2020 | Vanko et al. | |
| 2020/0189064 | A1 | 6/2020 | Takeda et al. | |
| 2020/0223026 | A1 | 7/2020 | Fisher et al. | |
| 2020/0227975 | A1 | 7/2020 | Purohit et al. | |
| 2020/0228046 | A1 | 7/2020 | White et al. | |
| 2020/0235694 | A1 | 7/2020 | White et al. | |
| 2020/0238497 | A1 | 7/2020 | Wang et al. | |
| 2020/0266751 | A1 | 8/2020 | White et al. | |
| 2020/0266752 | A1 | 8/2020 | White et al. | |
| 2020/0313511 | A1 | 10/2020 | Murui et al. | |
| 2020/0313512 | A1 | 10/2020 | Beyerl | |
| 2020/0335834 | A1 | 10/2020 | Velderman et al. | |
| 2020/0343596 | A1 | 10/2020 | Velderman et al. | |
| 2020/0368831 | A1 | 11/2020 | Kani et al. | |
| 2020/0382045 | A1 | 12/2020 | White et al. | |
| 2020/0403553 | A1 | 12/2020 | White et al. | |
| 2020/0412294 | A1 | 12/2020 | Cox | |
| 2021/0001466 | A1 | 1/2021 | Valentini | |
| 2021/0016428 | A1 | 1/2021 | Nakashima | |
| 2021/0028671 | A1 | 1/2021 | Chung et al. | |
| 2021/0036637 | A1 | 2/2021 | Nieh et al. | |
| 2021/0046630 | A1 | 2/2021 | Verbrugge et al. | |
| 2022/0395950 | A1* | 12/2022 | Urig .......................... | B27C 5/10 |

FOREIGN PATENT DOCUMENTS

| | | | |
|---|---|---|---|
| CN | 209503763 | U | 10/2019 |
| CN | 110549434 | A | 12/2019 |
| CN | 211029448 | U | 7/2020 |
| CN | 211029466 | U | 7/2020 |
| CN | 211030381 | U | 7/2020 |
| CN | 212145847 | U | 12/2020 |
| CN | 212399150 | U | 1/2021 |
| CN | 213889889 | U | 8/2021 |
| DE | 1994146 | U | 9/1968 |
| DE | 7827496 | U1 | 3/1980 |
| DE | 3446846 | A1 | 7/1985 |
| DE | 3606830 | A1 | 9/1987 |
| DE | 19650364 | A1 | 6/1998 |
| DE | 19753304 | A1 | 6/1999 |
| DE | 10035560 | A1 | 1/2002 |
| DE | 10035561 | A1 | 1/2002 |
| DE | 202010006816 | U1 | 10/2010 |
| DE | 102009055860 | A1 | 6/2011 |
| DE | 102012223910 | A1 | 6/2014 |
| DE | 102017205565 | A1 | 10/2018 |
| DE | 102017217504 | A1 | 4/2019 |
| DE | 102019003735 | A1 | 12/2020 |
| EP | 0034713 | A1 | 9/1981 |
| EP | 0920950 | A1 | 6/1999 |
| EP | 0924038 | A2 | 6/1999 |
| EP | 1166973 | A1 | 1/2002 |
| EP | 1193036 | A2 | 4/2002 |
| EP | 1792689 | A1 | 6/2007 |
| EP | 2062699 | A2 | 5/2009 |
| EP | 3716449 | A1 | 9/2020 |
| GB | 2449551 | A | 11/2008 |
| JP | H06226704 | A | 8/1994 |
| WO | 2005016594 | A1 | 2/2005 |
| WO | 2006050653 | A1 | 5/2006 |
| WO | 2014119126 | A1 | 8/2014 |

(56) References Cited

FOREIGN PATENT DOCUMENTS

| | | | |
|---|---|---|---|
| WO | 2014119127 | A1 | 8/2014 |
| WO | 2014119133 | A1 | 8/2014 |
| WO | 2016002542 | A1 | 1/2016 |
| WO | 2016089834 | A1 | 6/2016 |
| WO | 2018061556 | A1 | 4/2018 |
| WO | 2018168421 | A1 | 9/2018 |
| WO | 2019124444 | A1 | 6/2019 |
| WO | 2019130979 | A1 | 7/2019 |
| WO | 2020002049 | A1 | 1/2020 |
| WO | 2020136087 | A1 | 7/2020 |
| WO | 2020212141 | A1 | 10/2020 |
| WO | 2020232199 | A1 | 11/2020 |

OTHER PUBLICATIONS

International Search Report and Written Opinion for Application No. PCT/US2022/044856 dated Jan. 19, 2023 (13 pages).

* cited by examiner

ROUTER

CROSS-REFERENCE TO RELATED APPLICATIONS

This application is a national stage filing under 35 U.S.C. § 371 of International Application No. PCT/US2022/044856 filed on Sep. 27, 2022, which claims priority to U.S. Provisional Patent Application No. 63/249,941 filed Sep. 29, 2021, the entire contents of which are incorporated herein by reference.

FIELD OF THE DISCLOSURE

The disclosure relates generally to the field of power tools, and more particularly to the field of routers.

BACKGROUND OF THE DISCLOSURE

Routers are used to drill into a material, often wood, to cut rounded edges, make indented cuts, trace patterns, and make other designs in the material. In the past, it has been difficult to precisely and ergonomically adjust the depth that the router cuts into the material. Further, changing router bits can require a substantial amount of effort because there is a lack of quick, ergonomic, and effective spindle lock mechanisms. Further still, routers can be difficult to construct because of the large number of different bearing housings that are required.

SUMMARY OF THE DISCLOSURE

In one embodiment, a router includes a motor unit including an electric motor and a rotatable output shaft. The router also includes a base plate coupled to the motor unit, and a depth adjustment mechanism configured to adjust a position of the motor unit relative to the base plate. The depth adjustment mechanism includes a threaded depth adjustment shaft rotatably coupled to one of the motor unit and the base plate and translationally affixed thereto. The depth adjustment mechanism also includes a micro depth adjustment shaft rotatably coupled to the other of the motor unit and the base plate and translationally affixed thereto, the micro depth adjustment shaft being received into a keyed bore defined in the threaded depth adjustment shaft in a telescoping arrangement. Rotation of the micro depth adjustment shaft rotates the threaded depth adjustment shaft to effect movement of the motor unit relative to the base plate.

In some constructions, the depth adjustment mechanism further comprises a macro depth adjustment actuator supported on the other of the motor unit and the base plate and having meshing threads configured to threadably engage the threaded depth adjustment shaft. In some constructions, the depth adjustment mechanism further comprises a micro depth adjustment actuator affixed to the micro depth adjustment shaft and rotatable to rotate the threaded depth adjustment shaft.

In another embodiment, a router includes a housing assembly, an electric motor, a rotatable output shaft coupled to the electric motor, the output shaft defining a non-circular outer shape, and a spindle lock mechanism configured to selectively prevent rotation of the output shaft. The spindle lock mechanism includes a locking plate at least partially surrounding the output shaft and including a non-circular inner shape corresponding to the non-circular outer shape. The spindle lock mechanism also includes a spindle lock actuator configured to move the locking plate between a locked position in which the non-circular inner shape engages the non-circular outer shape, and an unlocked position in which the non-circular inner shape is disengaged from the non-circular outer shape. The spindle lock mechanism further includes a detent member slidably supported on the housing assembly and biased toward the locking plate. When the locking plate is in the locked position, the detent member engages a detent recess defined in the locking plate to provisionally secure the locking plate in the locked position.

In another embodiment, a router includes a base plate and a motor unit movably coupled to the base plate. The motor unit includes an outer housing, an inner housing affixed to the outer housing and at least partially surrounded by the outer housing, and a drive assembly supported within the inner housing. The inner housing includes an upper inner housing affixed to a lower inner housing. The drive assembly includes a motor configured to rotate a motor shaft, and an output shaft extending parallel to the motor shaft and configured to receive a torque from the motor shaft. The drive assembly also includes an upper motor bearing supported by the upper inner housing and at least partially supporting the motor shaft. The drive assembly further includes a lower motor bearing supported by the lower inner housing at least partially supporting the motor shaft. The drive assembly also includes an upper spindle bearing supported by the upper inner housing and at least partially supporting the output shaft. The drive assembly further includes a lower spindle bearing supported by the upper inner housing and at least partially supporting the output shaft.

Before any embodiments of the disclosure are explained in detail, it is to be understood that the disclosure is not limited in its application to the details of embodiment and the arrangement of components set forth in the following description or illustrated in the following drawings. The disclosure is capable of other embodiments and of being practiced or of being carried out in various ways. Also, it is to be understood that the phraseology and terminology used herein is for the purpose of description and should not be regarded as limiting.

DETAILED DESCRIPTION

For simplicity and illustrative purposes, the present disclosure is described by referring mainly to an exemplary embodiment thereof. In the following description, numerous specific details are set forth in order to provide a thorough understanding of the present disclosure. However, it will be readily apparent to one of ordinary skill in the art that the present disclosure may be practiced without limitation to these specific details.

Figure 1:
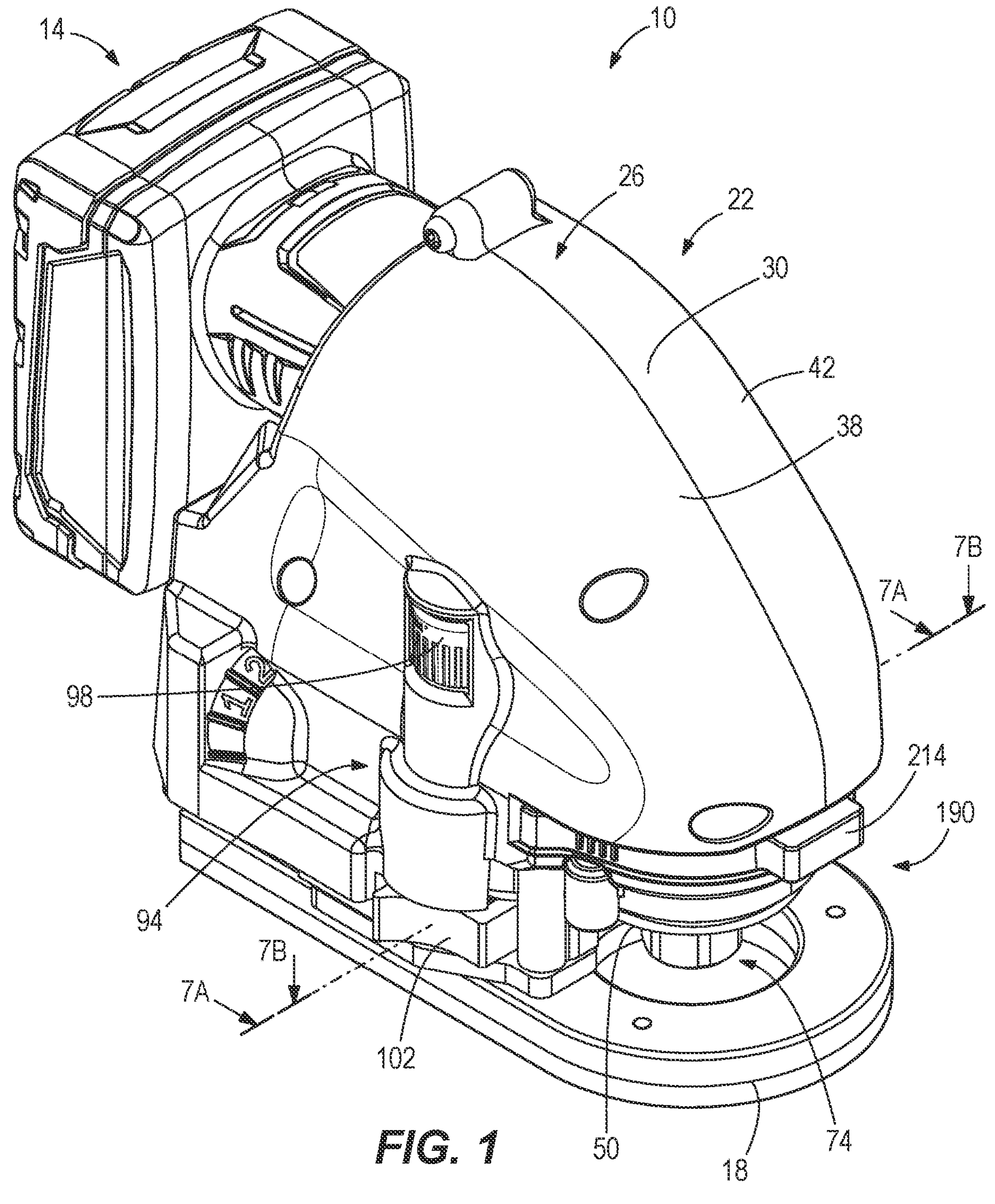
FIG. 1 illustrates a perspective view of a router coupled to a battery pack.
Figure 2:
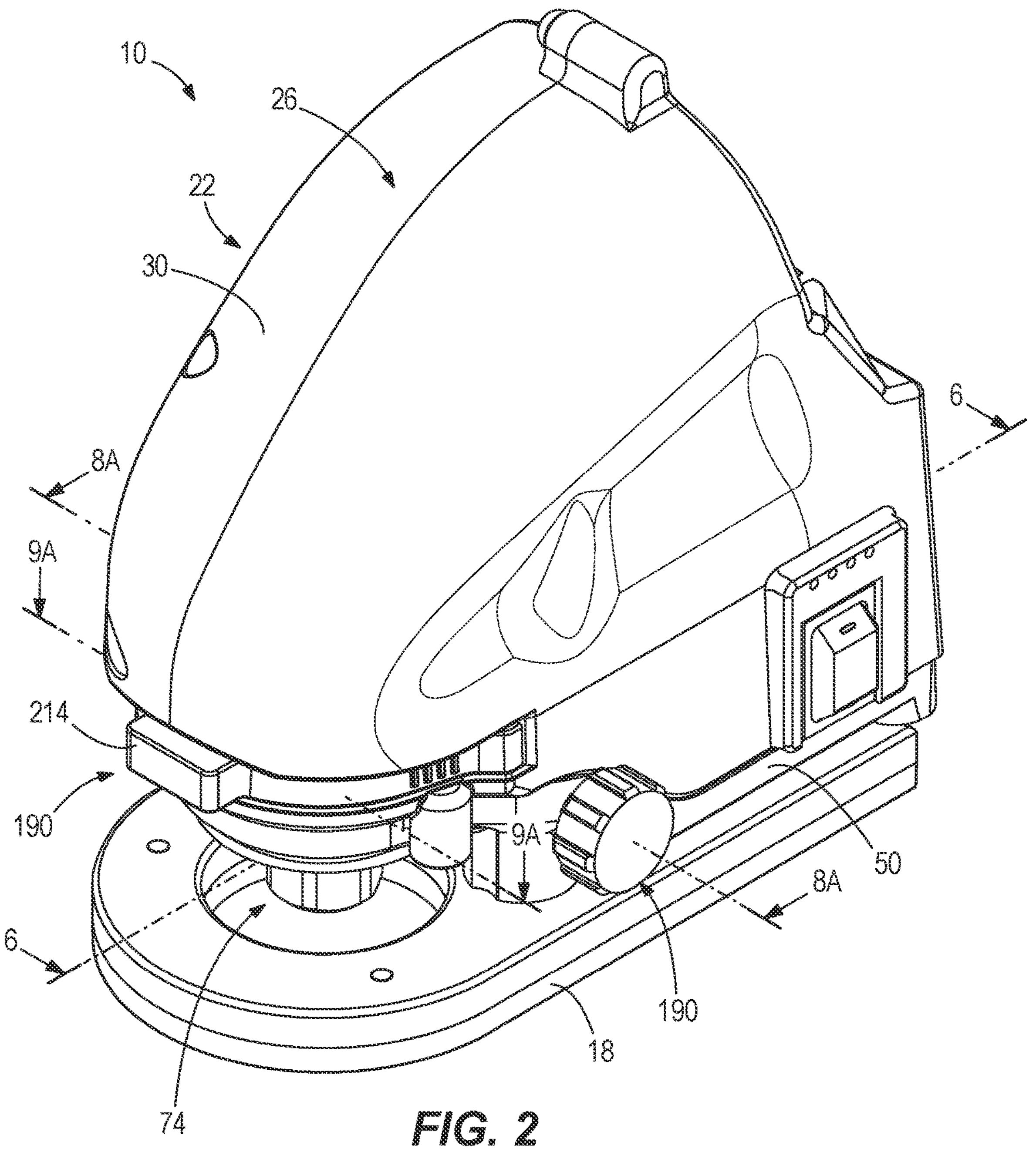
FIGS. 2 and 3 illustrate perspective views of the router of FIG. 1.
Figure 3:
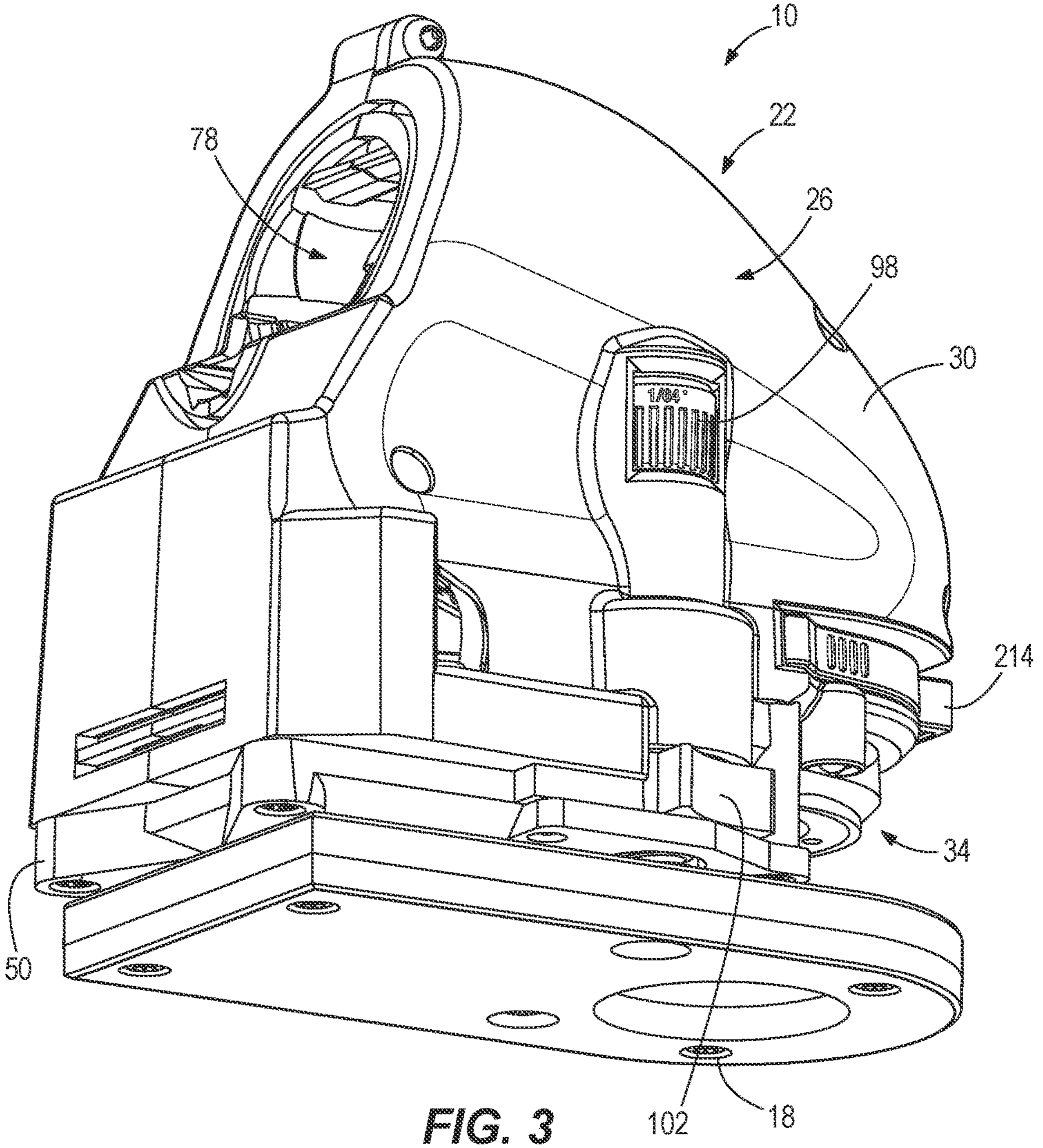

FIGS. 1-3 illustrate an embodiment of a router 10 coupled to a removable battery pack 14. The router 10 includes a base plate 18 and a motor unit 22 that is movably coupled to the base plate 18. The motor unit 22 includes a housing assembly 26 formed by an outer housing 30 and an inner housing 34 (FIG. 4) that is supported at least partially within the outer housing 30. The outer housing 30 includes first and second clamshell halves 38, 42 that, in the illustrated embodiment, are coupled to one another via fasteners. The inner housing 34 (FIG. 4) includes an upper inner housing 46 and a lower inner housing 50. A portion of the lower inner housing 50 protrudes beyond the outer housing 30 and is visible without removing the outer housing 30.

Figure 4:
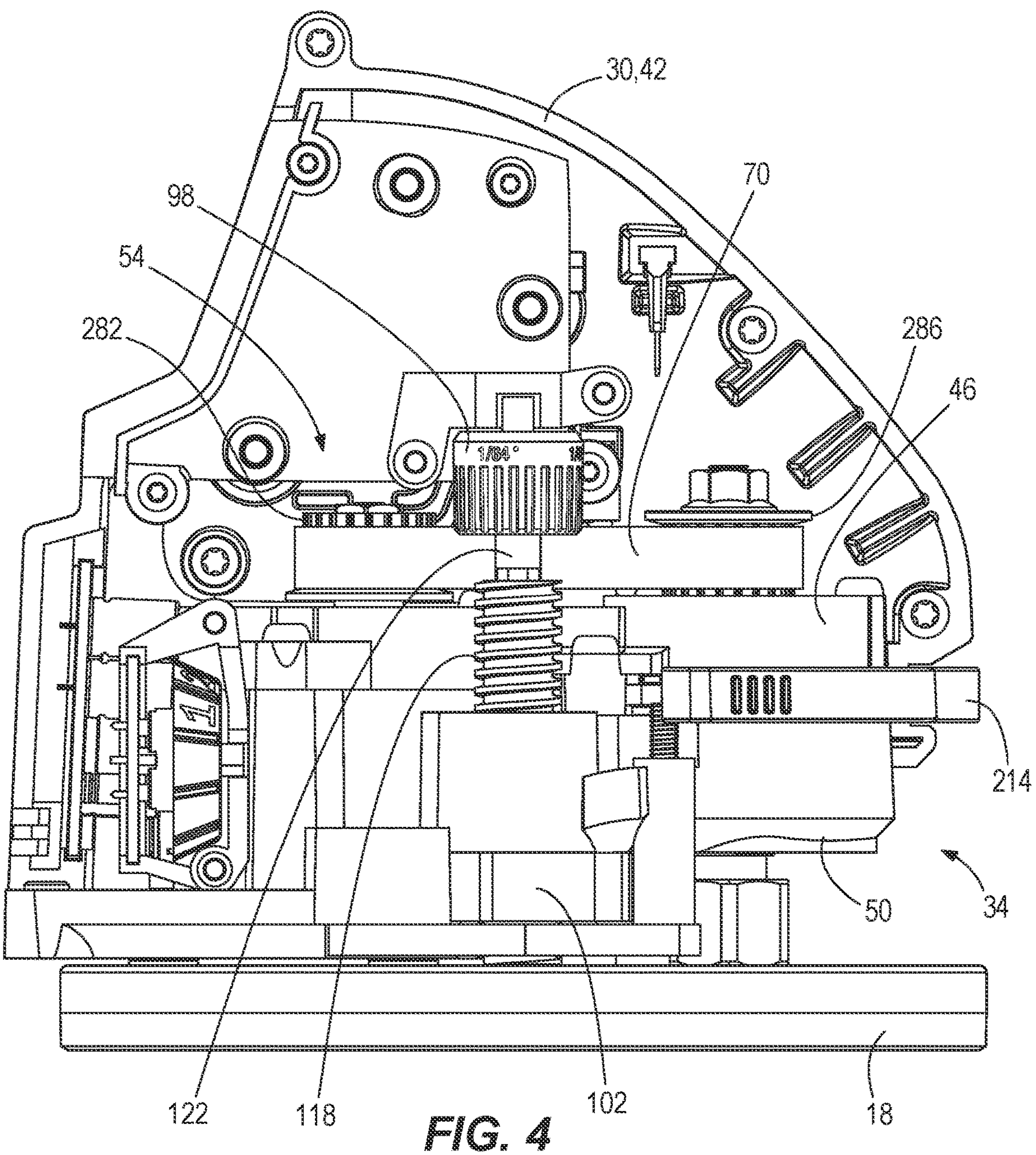
FIG. 4 illustrates a first side view of the router of FIG. 1 with some components, including a first side outer housing, removed.
Figure 5:
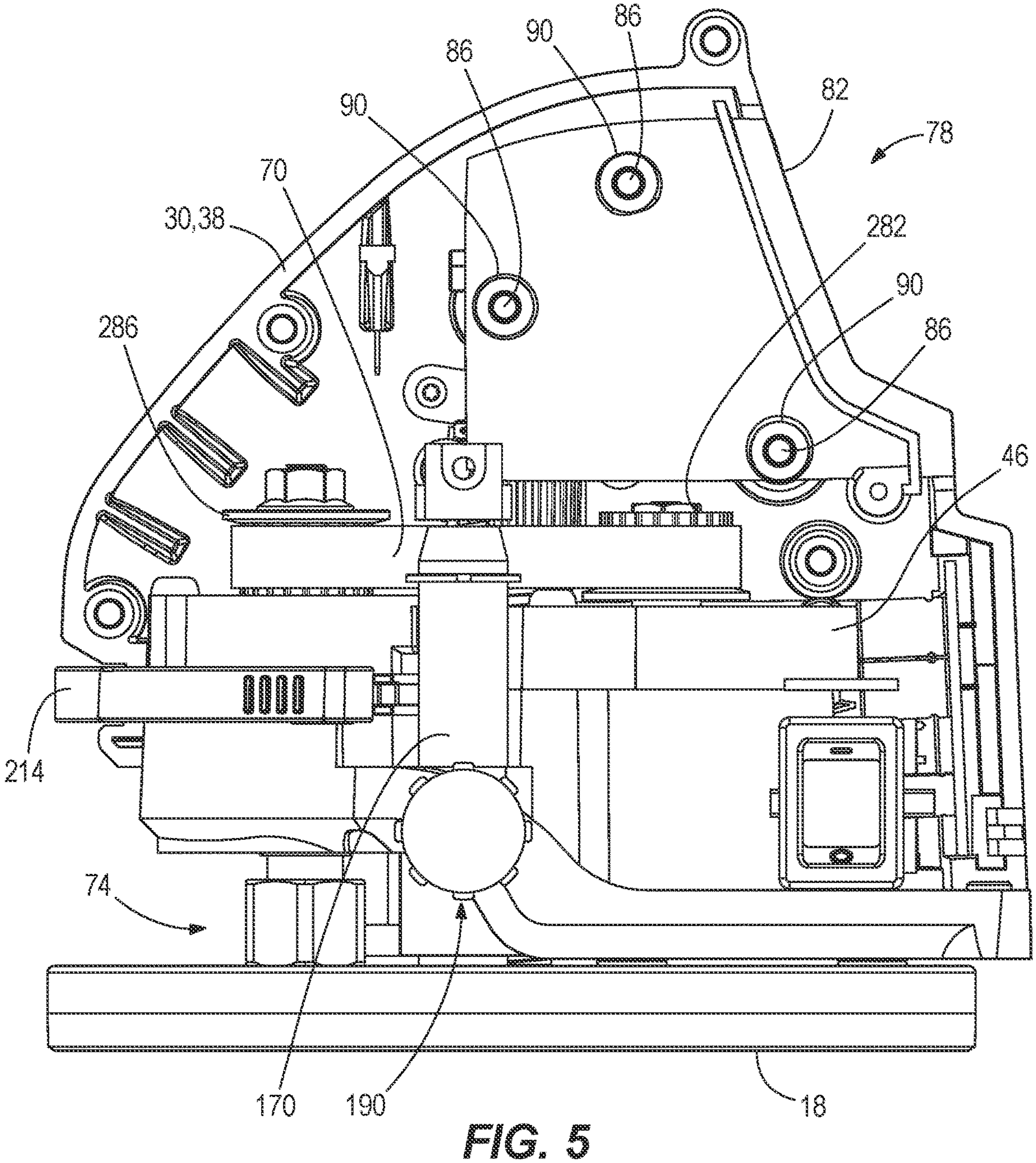
FIG. 5 illustrates a second side view of the router of FIG. 1 with some components, including a second side outer housing, removed.
Figure 6:
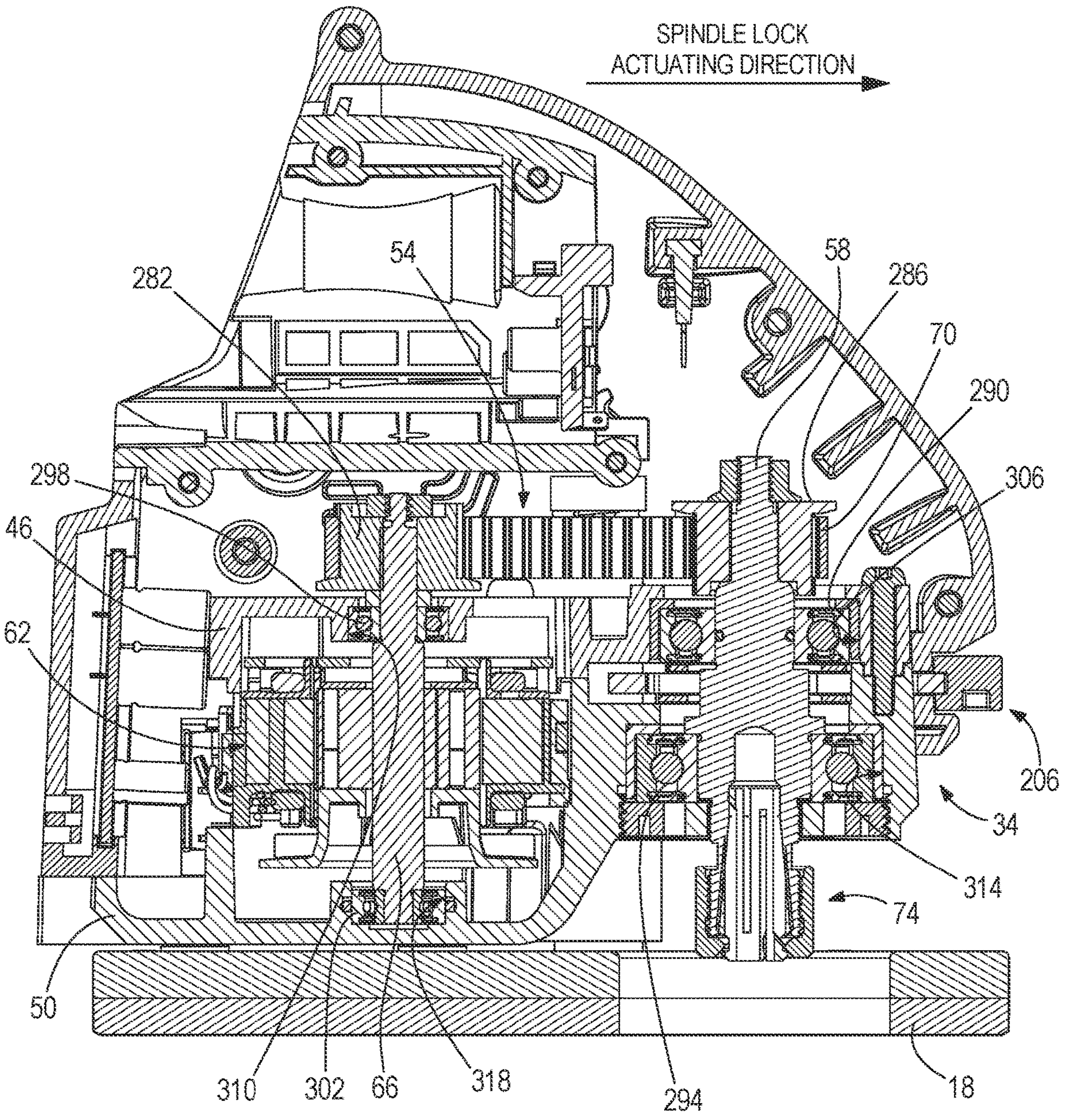
FIG. 6 illustrates a cross sectional view of the router of FIG. 1, taken along line 6-6 of FIG. 2.

With reference to FIGS. 4-6, the router 10 includes a drive assembly 54 supported within the inner housing 34. The drive assembly 54 includes a rotatable output shaft 58 and a motor 62 with a rotatable motor shaft 66 that supplies torque to the output shaft 58 via a drive belt 70. The output shaft 58 supports a collet assembly 74 that receives a cutting tool (e.g., a router bit or the like).

With reference to FIGS. 3-5, the router 10 includes a battery receptacle 78 that selectively receives the battery pack 14 to electrically couple the battery pack 14 (FIG. 1) to the router 10. The battery receptacle 78 includes a receptacle housing 82 supported within the outer housing 30 and vibrationally isolated from the outer housing 30. The receptacle housing 82 includes a plurality of laterally protruding posts 86 that support ring-shaped damping members 90. The posts 86 and the damping members 90 are received into damping pockets 92 (FIG. 7A) defined in an interior surface of the outer housing 30. As such, the damping members 90 are disposed between the receptacle housing 82 and the outer housing 30 and dampen the transmission of vibrations from the outer housing 30 to the battery pack 14 during operation of the router 10.

With reference to FIGS. 2 and 7A-7C, the router 10 also includes a depth adjustment mechanism 94 that is operable to adjust a cutting depth of the cutting tool by adjusting a position of the motor unit 22 relative to the base plate 18. Specifically, the depth adjustment mechanism 94 enables the motor unit 22 to move toward the base plate 18 to increase the cutting depth and move away from the base plate 18 to decrease the cutting depth. The depth adjustment mechanism 94 includes a micro depth adjustment actuator 98 and a macro depth adjustment actuator 102. The micro depth adjustment actuator 98 is provided as a dial 98 that is rotatable to perform micro depth adjustments. The macro depth adjustment actuator 102 is provided as a sliding member 102 that, when actuated, allows the motor unit 22 to be manually pressed toward or pulled away from the base plate 18 to perform macro depth adjustments.

The depth adjustment mechanism 94 includes a depth adjustment shaft assembly 114 having a threaded depth adjustment shaft 118 and a micro depth adjustment shaft 122. The threaded depth adjustment shaft 118 is rotatably coupled to the base plate 18 and translationally fixed relative thereto, and the micro depth adjustment shaft 122 is rotatably coupled to the housing assembly 26 and translationally fixed relative thereto. As such, when the motor unit 22 moves relative to the base plate 18, the position of the threaded depth adjustment shaft 118 remains fixed relative to the base plate 18 and the position of the micro depth adjustment shaft 122 remains fixed relative to the housing assembly 26. The inner housing 34 includes a laterally protruding lobe 126 that defines a bore 130 through which the threaded depth adjustment shaft 118 extends. In the illustrated embodiment, a bushing 134 is positioned within the bore 130 and the threaded depth adjustment shaft 118 slides within the bushing 134, which reduces friction and prevents damage to the threads.

The threaded depth adjustment shaft 118 is hollow and defines a keyed internal bore 138 that receives the micro depth adjustment shaft 122 in a keyed telescoping engagement. As such, the micro depth adjustment shaft 122 is permitted to translate relative to the threaded depth adjustment shaft 118 and also co-rotates with the threaded depth adjustment shaft 118 as the dial 98 is rotated. An outer surface of the micro depth adjustment shaft 122 engages with an inner surface of the keyed internal bore 138 of the threaded depth adjustment shaft 118 such that the threaded depth adjustment shaft 118 can slide linearly relative to the micro depth adjustment shaft 122 to facilitate macro and micro depth adjustments.

Figure 7A:
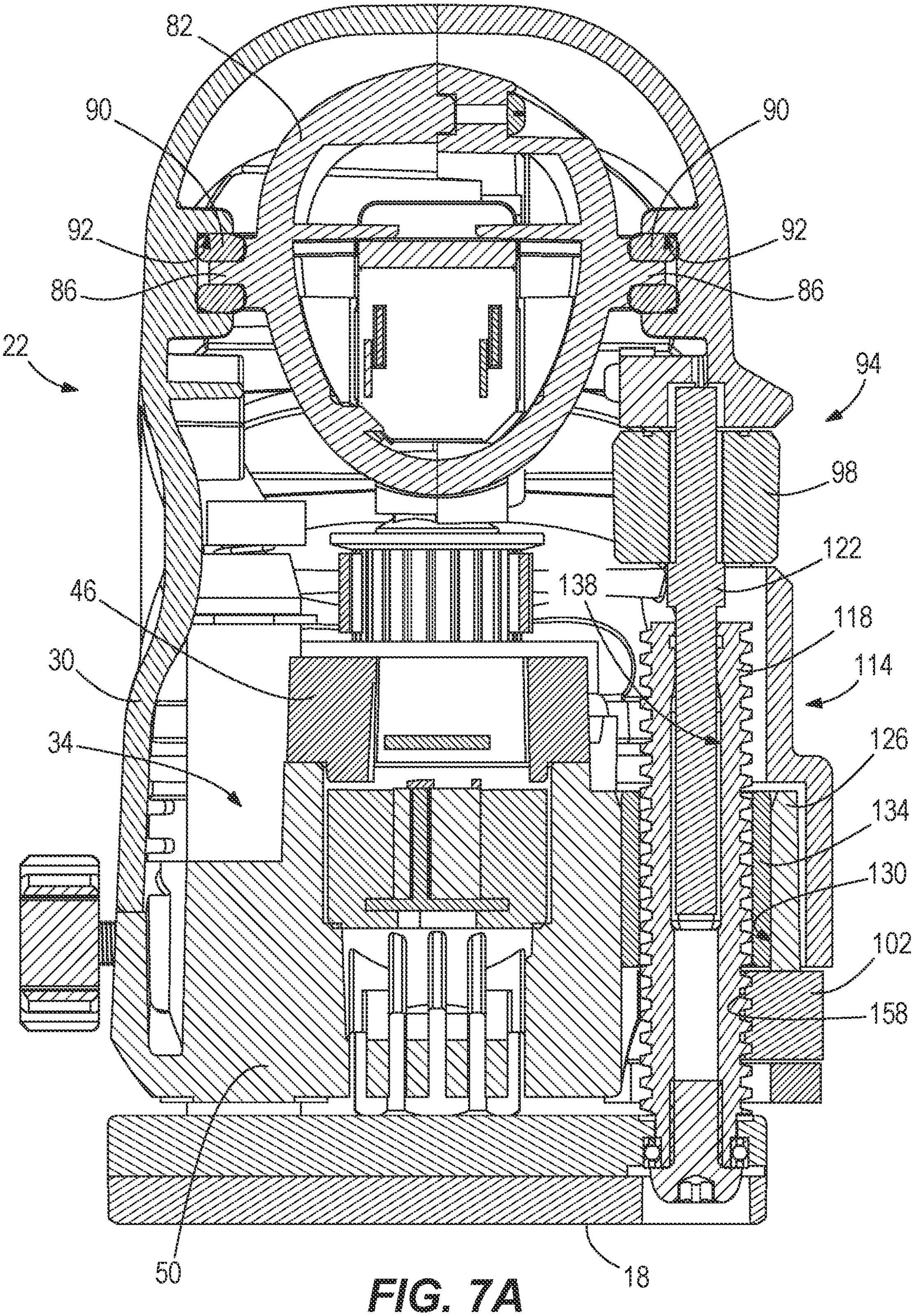
FIG. 7A illustrates a cross sectional view of the router of FIG. 1, taken along line 7A-7A of FIG. 1, showing a depth adjustment mechanism.
Figure 7B:
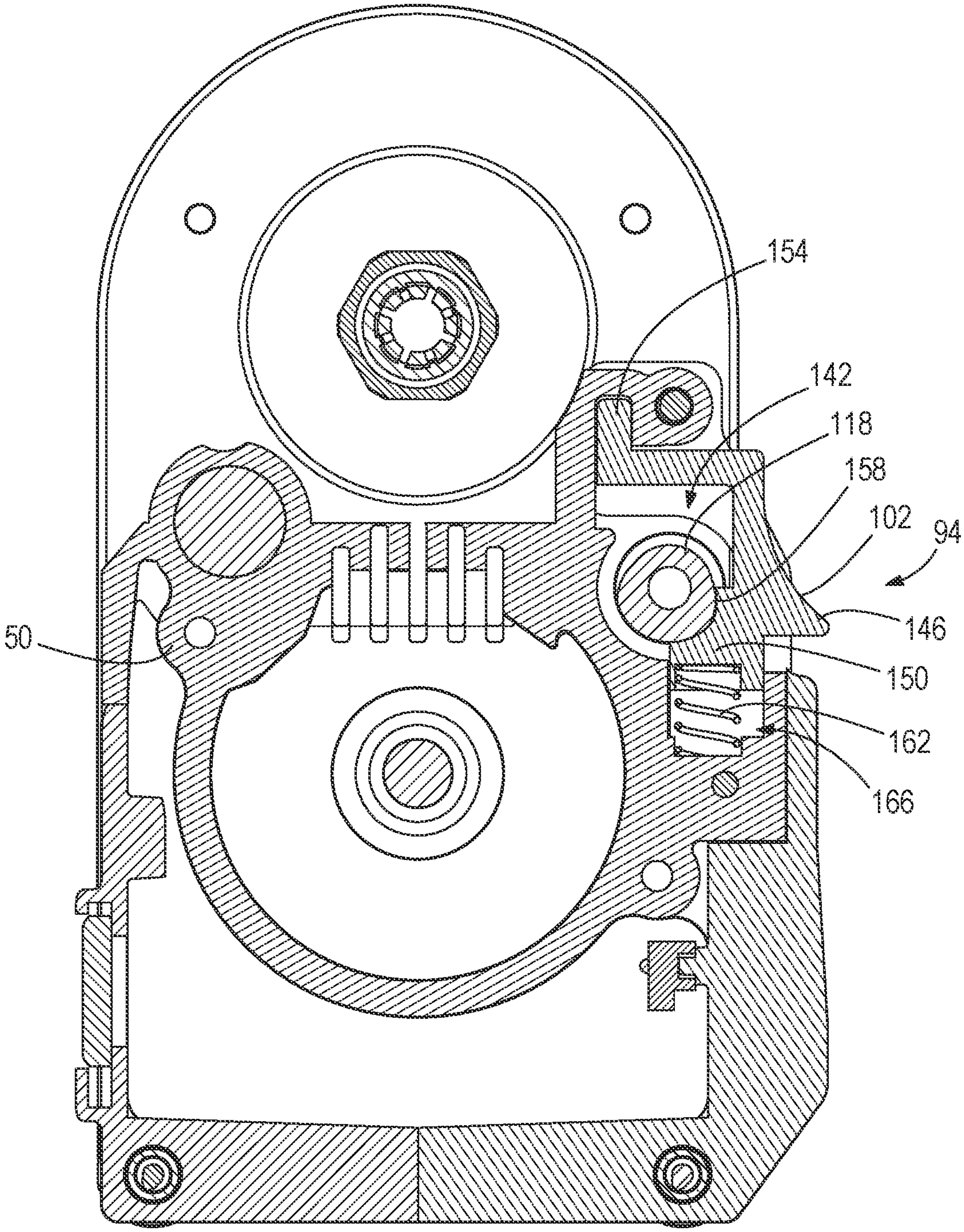
FIG. 7B illustrates a cross sectional plan view of the router of FIG. 1, taken along line 7B-7B of FIG. 1, showing the depth adjustment mechanism.

With reference to FIGS. 7A and 7B, the sliding member 102 is slidably received into a recess 142 defined in the lower inner housing 50. As such, the sliding member 102 remains with the motor unit 22 during depth adjustments. In this embodiment, the sliding member 102 includes a thumb engagement portion 146, a threaded shaft engagement portion 150, and a support portion 154 that fits into a support region of the recess 142. The sliding member 102 engages with the threaded depth adjustment shaft 118 by means of corresponding meshing threads 158 which are cut into the threaded shaft engagement portion 150. A spring 162 resides within a spring recess 166 in the lower inner housing 50 and biases the sliding member 102 into an engaged position at which the meshing threads 158 are engaged with the threaded depth adjustment shaft 118. When the user applies force to the thumb engagement portion 146, the sliding member 102 slides along a longitudinal direction of the router 10 toward a disengaged position at which the meshing threads 158 disengage from threaded depth adjustment shaft 118. With the sliding member 102 located in the disengaged position, the motor unit 22 to be manually pressed toward or pulled away from the base plate 18 to perform macro depth adjustments.

Figure 7C:
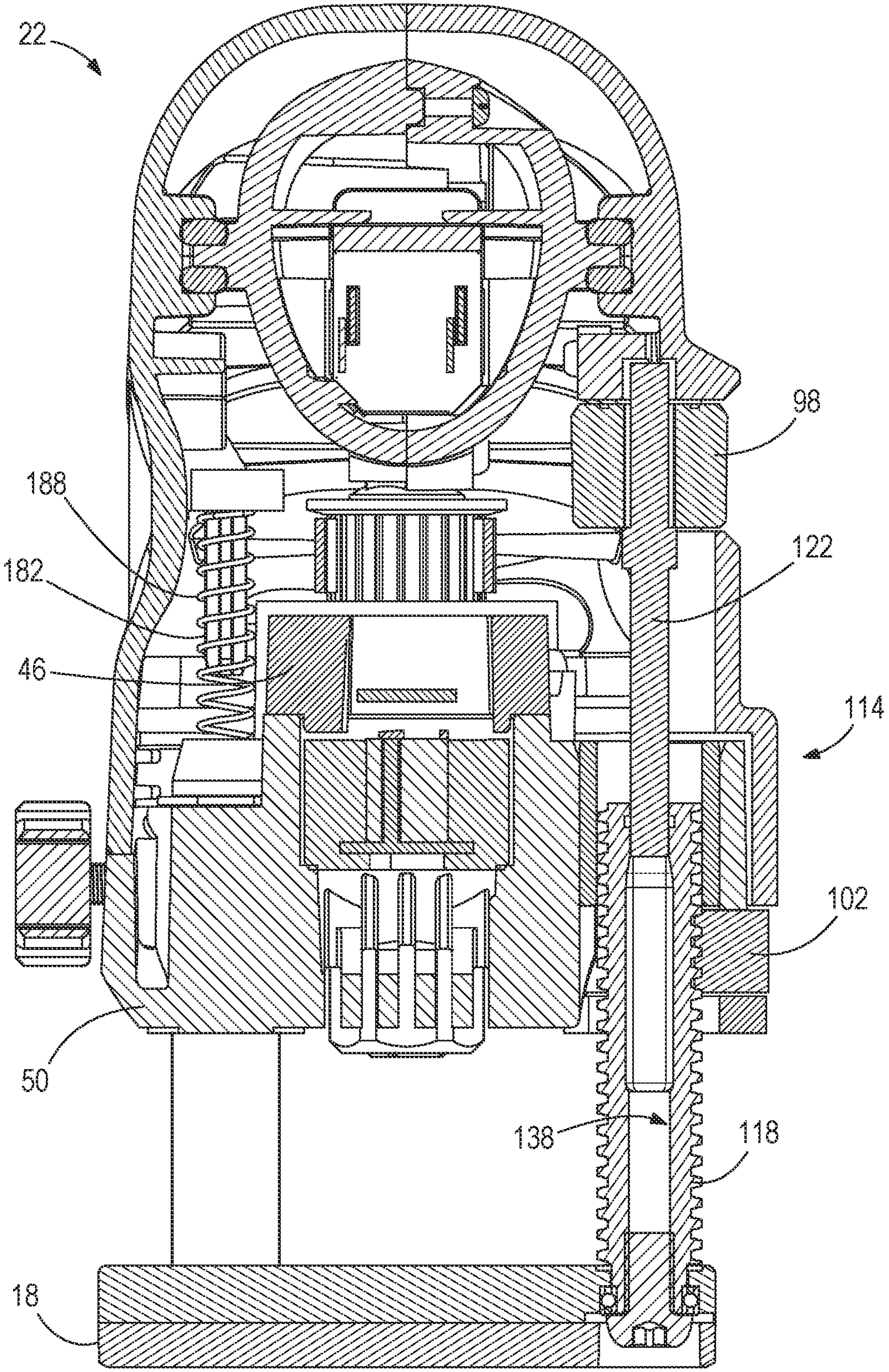
FIG. 7C illustrates a cross sectional view of the router of FIG. 1, taken along line 7A-7A of FIG. 1, showing the depth adjustment mechanism extended.

FIG. 7A shows a cross sectional view of the router 10 with the base plate 18 adjusted to a nearest position relative to the motor unit 22. This position corresponds to the deepest cutting depth for the router 10 because the cutting tool will protrude a maximum distance below a bottom surface of the base plate 18. FIG. 7C shows a cross sectional view of the router 10 with the base plate 18 adjusted to a furthest position relative to the motor unit 22. This position corresponds to the most shallow cutting depth for the router 10 because the cutting tool will only minimally, if at all, protrude below the bottom surface of the base plate 18.

With reference to FIG. 7A, the dial 98 is affixed to an upper end of the micro depth adjustment shaft 122 such that rotation of the dial 98 causes the micro depth adjustment shaft 122 to rotate. Because of the keyed sliding engagement between the micro depth adjustment shaft 122 and the threaded depth adjustment shaft 118, rotating the dial 98 causes the threaded depth adjustment shaft 118 to rotate and forces the threads on the threaded depth adjustment shaft 118 to slide along the corresponding meshing threads 158 formed on the sliding member 102. The sliding interaction between the threads of the threaded depth adjustment shaft 118 and the meshing threads 158 of the sliding member 102 causes the sliding member 102 to translate upward or downward along the longitudinal length of the threaded depth adjustment shaft 118. The entire motor unit 22, including the micro depth adjustment shaft 122 and the dial 98, move in unison with the sliding member 102 such that rotation of the dial 98 effects micro depth adjustments.

In other words, actuating the sliding member 102 causes the sliding member 102 to disengage from the threaded depth adjustment shaft 118, allowing the user to pull the motor unit 22 away from the base plate 18 of the router 10. Then, the sliding member 102 can be released, causing it to reengage the threaded depth adjustment shaft 118. The user can still adjust the dial 98 to cause the micro depth adjustment shaft 122 to rotate, thereby causing the threaded depth adjustment shaft 118 to rotate and allowing the user to finely adjust the position of the motor unit 22 relative to the base plate 18.

Figure 8A:
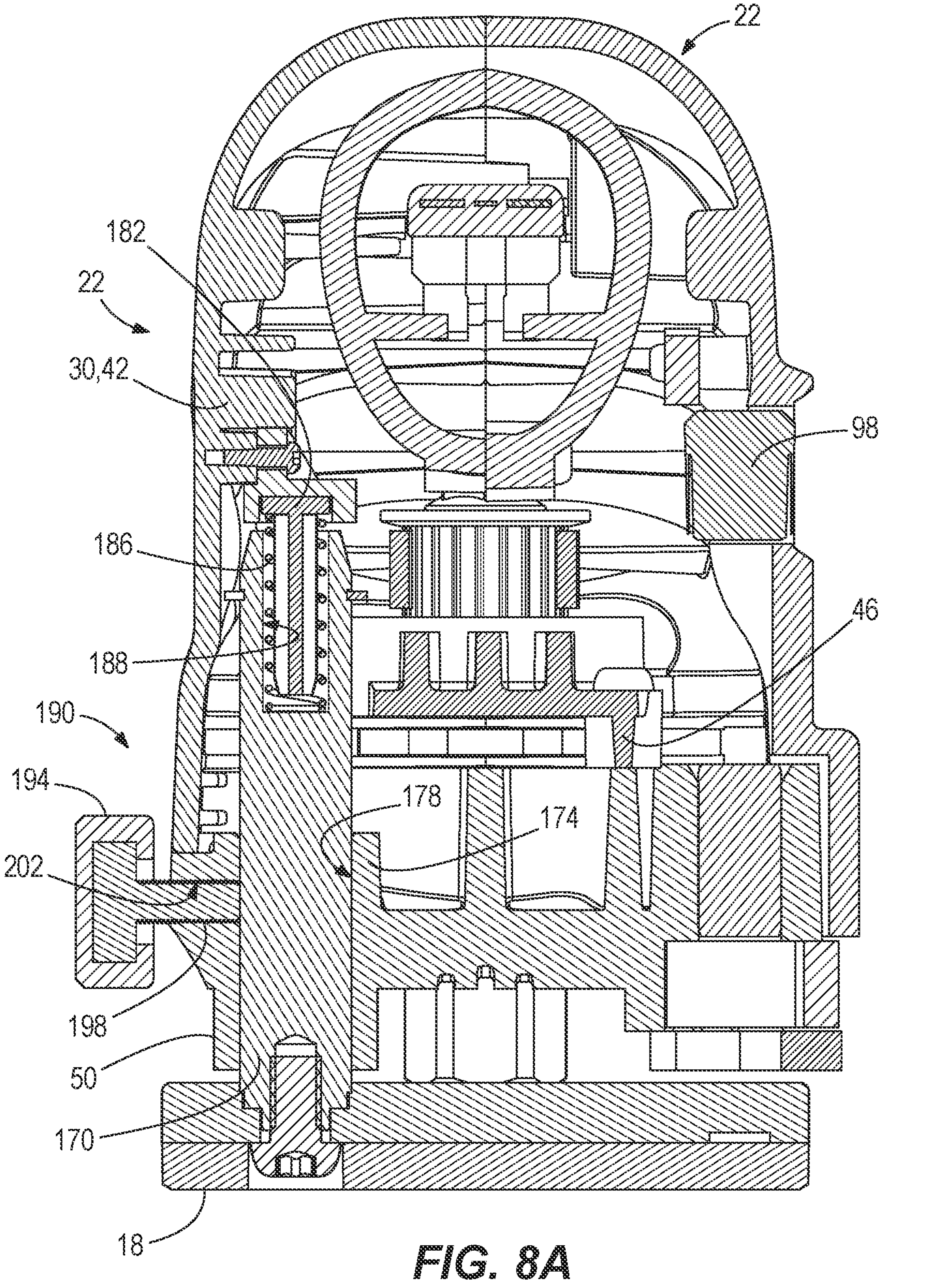
FIG. 8A illustrates a cross sectional view of the router of FIG. 1, taken along line 8A-8A of FIG. 2.
Figure 8B:
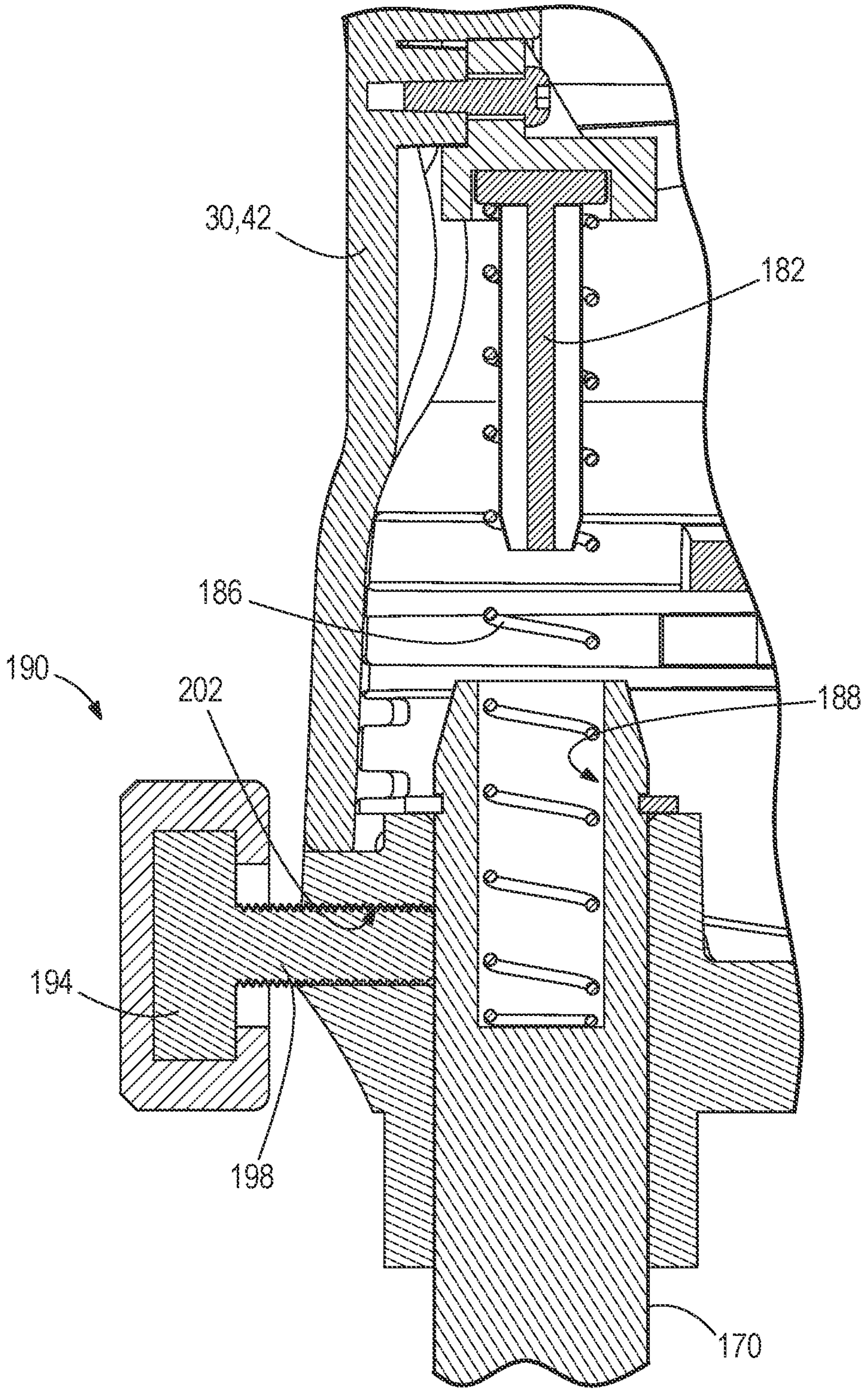
FIG. 8B illustrates a cross sectional view of the router of FIG. 1, taken along line 8A-8A of FIG. 2.

With reference to FIGS. 2, 8A, and 8B, the router 10 also includes a support column 170 attached to the base plate 18 and extending upward into an interior of the housing assembly 26 of the motor unit 22. The lower inner housing 50 includes a sleeve portion 174 defining a bore 178 that receives the support column 170 to align the motor unit 22 with the base plate 18. The router 10 also includes a support pin 182 affixed to the outer housing 30 and extending downward toward the support column 170. A support spring 186 is positioned between the support pin 182 and the support column 170 to bias the support pin 182 away from the support column 170. In the illustrated embodiment, one end of the support spring 186 extends inside a support column recess 188 defined in the support column 170 and another end of the support spring 186 extends over the support pin 182. The support spring 186 serves to bias the motor unit 22 away from the base plate 18. As such, when the sliding member 102 (FIG. 7B) is pressed to the disengaged position, the motor unit 22 tends to move away from the base plate 18 due to the biasing force exerted by the support spring 186 between the support column 170) and the support pin 182.

In other embodiments (not shown), a spring or other biasing mechanism may additionally or alternatively be located in the keyed internal bore 130 (FIG. 7A) within the threaded depth adjustment shaft 118. In such embodiments, the biasing mechanism may bias the threaded depth adjustment shaft 118 toward the extended position, and in other embodiments, the biasing mechanism may bias the threaded depth adjustment shaft 118 toward the retracted position.

With continued reference to FIGS. 2, 8A, and 8B, the router 10) also includes a depth lock mechanism 190 operable to selectively lock a position of the motor unit 22 relative to the base plate 18 to thereby lock a cutting depth of the router 10. The depth lock mechanism 190 includes a knob 194 affixed to a threaded shaft 198 that threads into a transverse threaded bore 202. The transverse threaded bore 202 communicates with the bore 178 defined in the sleeve portion 174 of the lower inner housing 50. The user can rotate the knob 194 to turn the threaded shaft 198, causing the threaded shaft 198 to selectively bear against the support column 170 and prevent the lower inner housing 50 from moving relative to the support column 170. Once the motor unit 22 is adjusted to its desired position via the sliding member 102 and/or dial 98, the knob 194 can be tightened to lock the depth of the motor unit 22. When the depth lock mechanism 190 is in the locked configuration, further depth adjustments cannot be performed via the sliding member 102 or the dial 98.

Figure 9A:
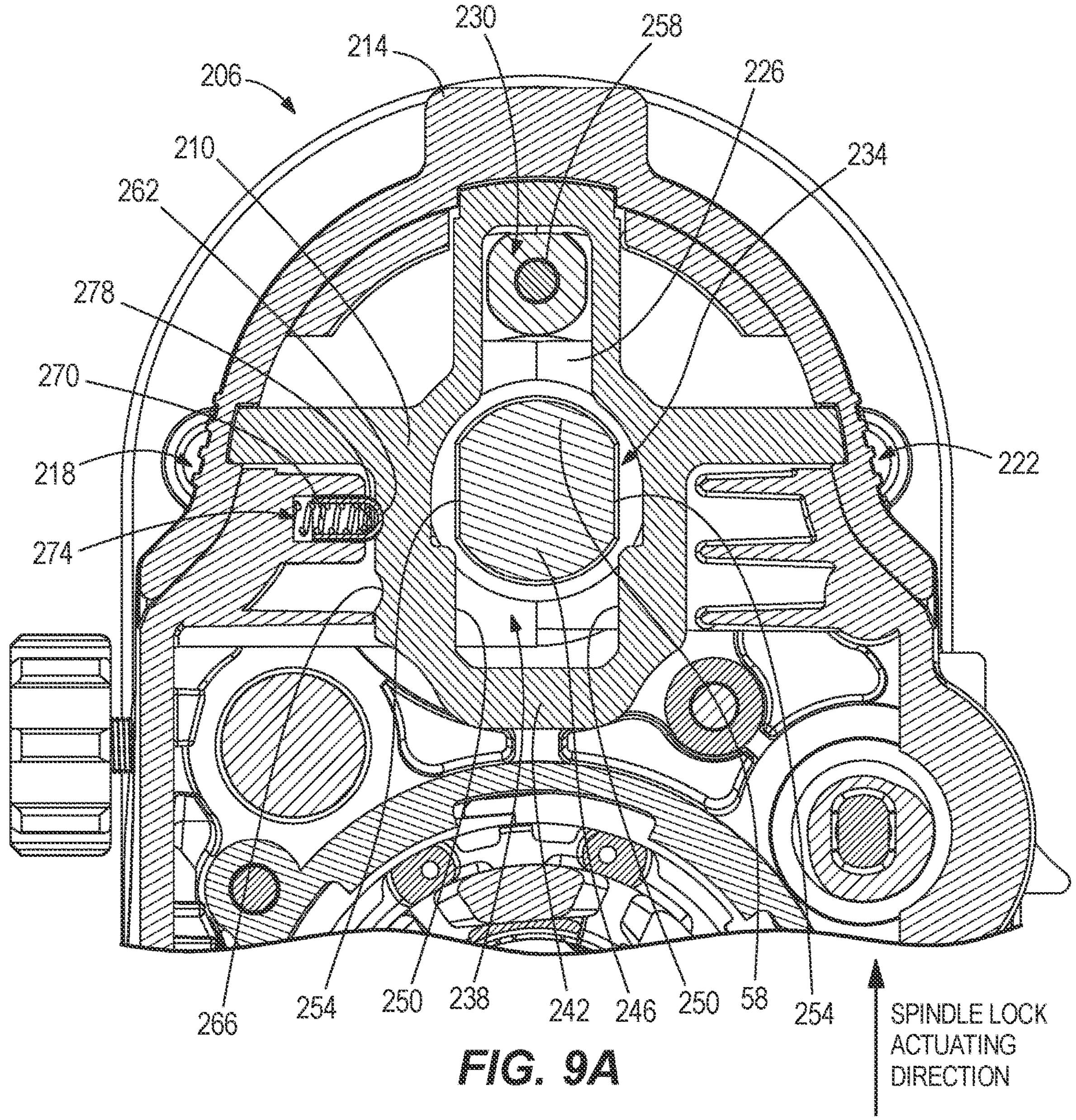
FIG. 9A illustrates a cross sectional plan view of the router of FIG. 1, taken along line 9A-9A of FIG. 2, showing a spindle lock mechanism.
Figure 9B:
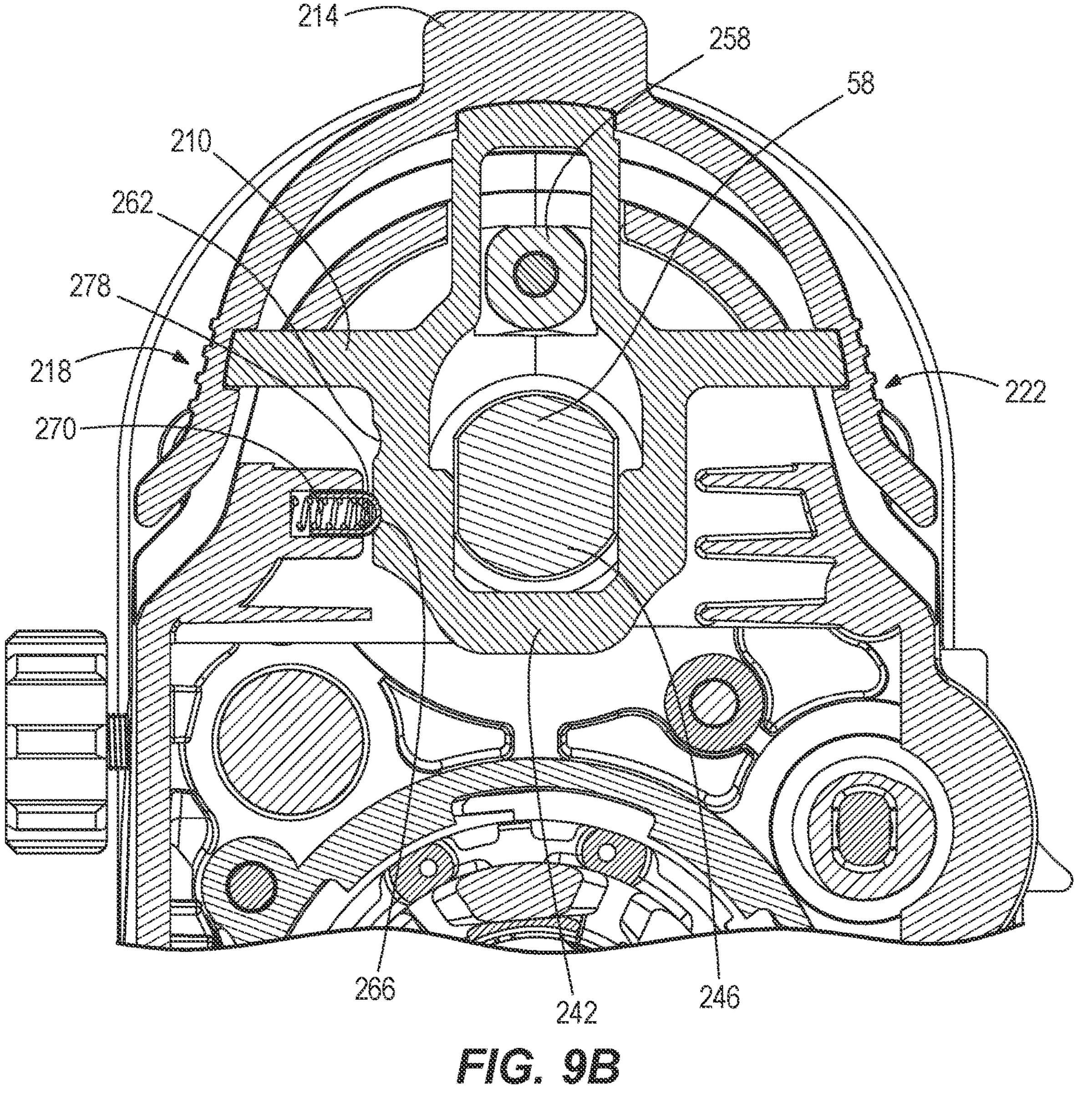
FIG. 9B illustrates a cross sectional plan view of the router of FIG. 1, taken along line 9A-9A of FIG. 2, showing the spindle lock mechanism in the locked position.
Figure 10:
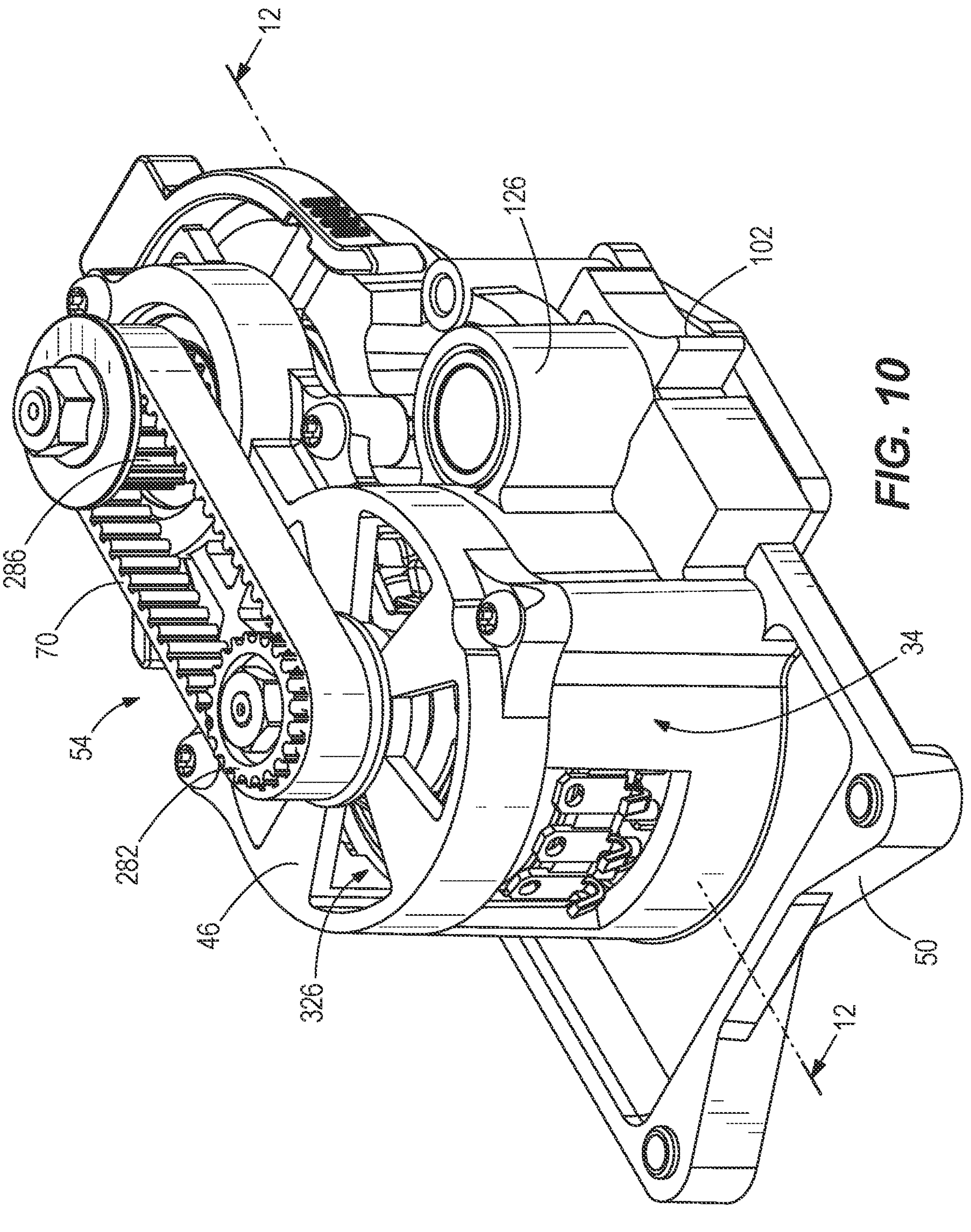
FIG. 10 illustrates a perspective view of the router of FIG. 1 with some components removed to show an inner housing.
Figure 11:
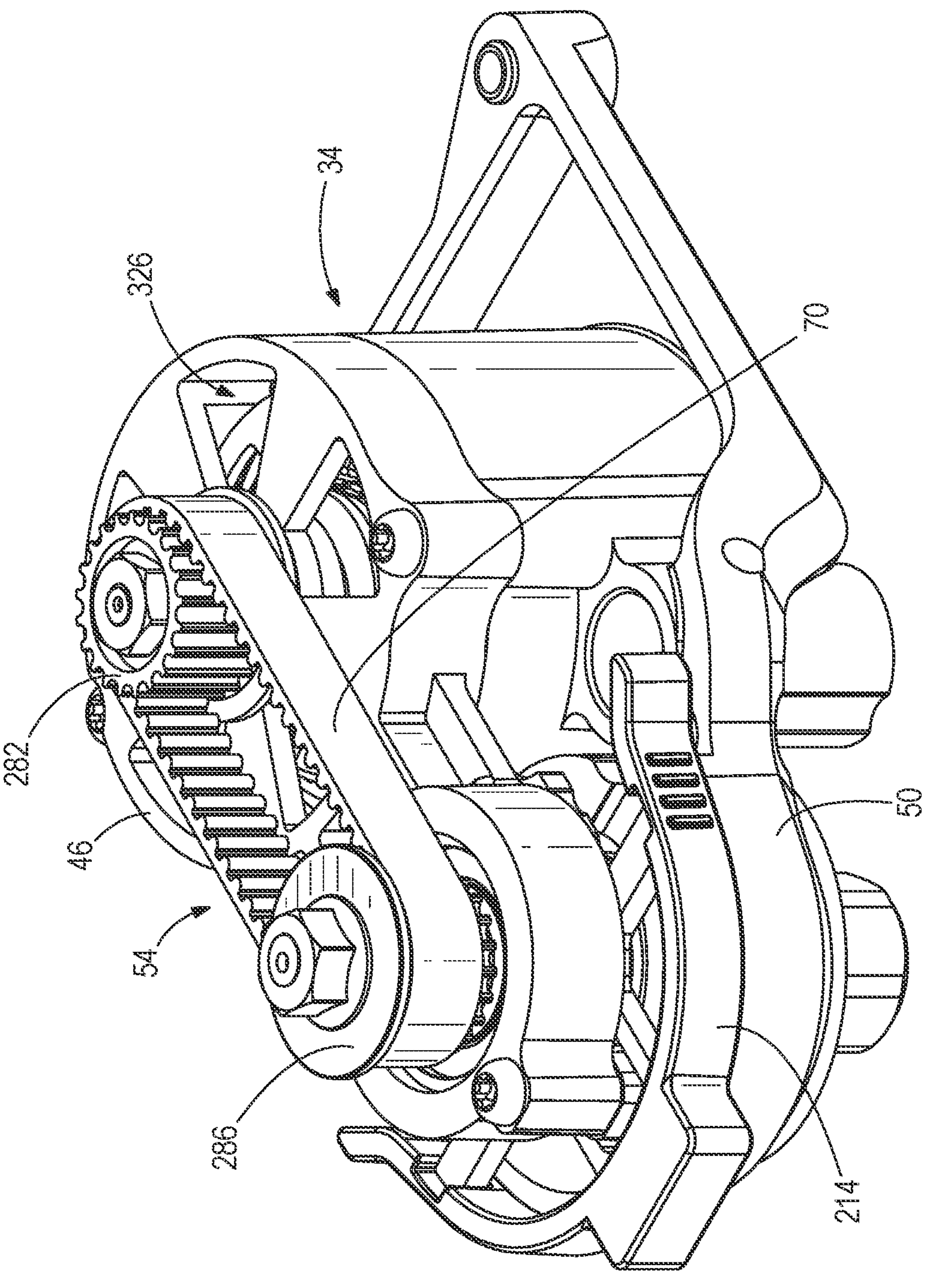
FIG. 11 illustrates a perspective view of the router of FIG. 1 with some components removed to show the inner housing.
Figure 12:
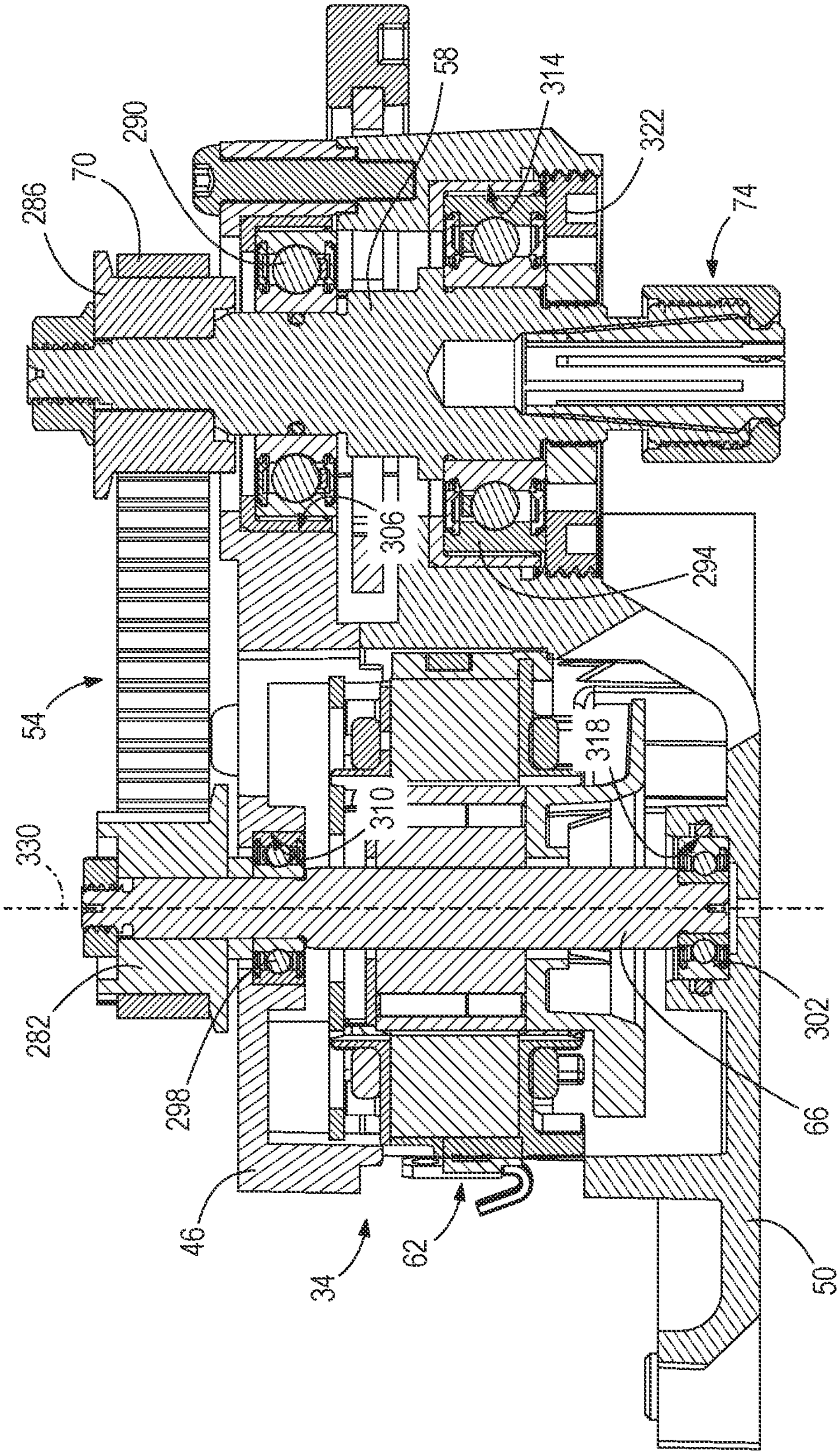
FIG. 12 illustrates a cross sectional view of the router of FIG. 1, taken along line 12-12 of FIG. 10, with some components removed.
Figure 13:
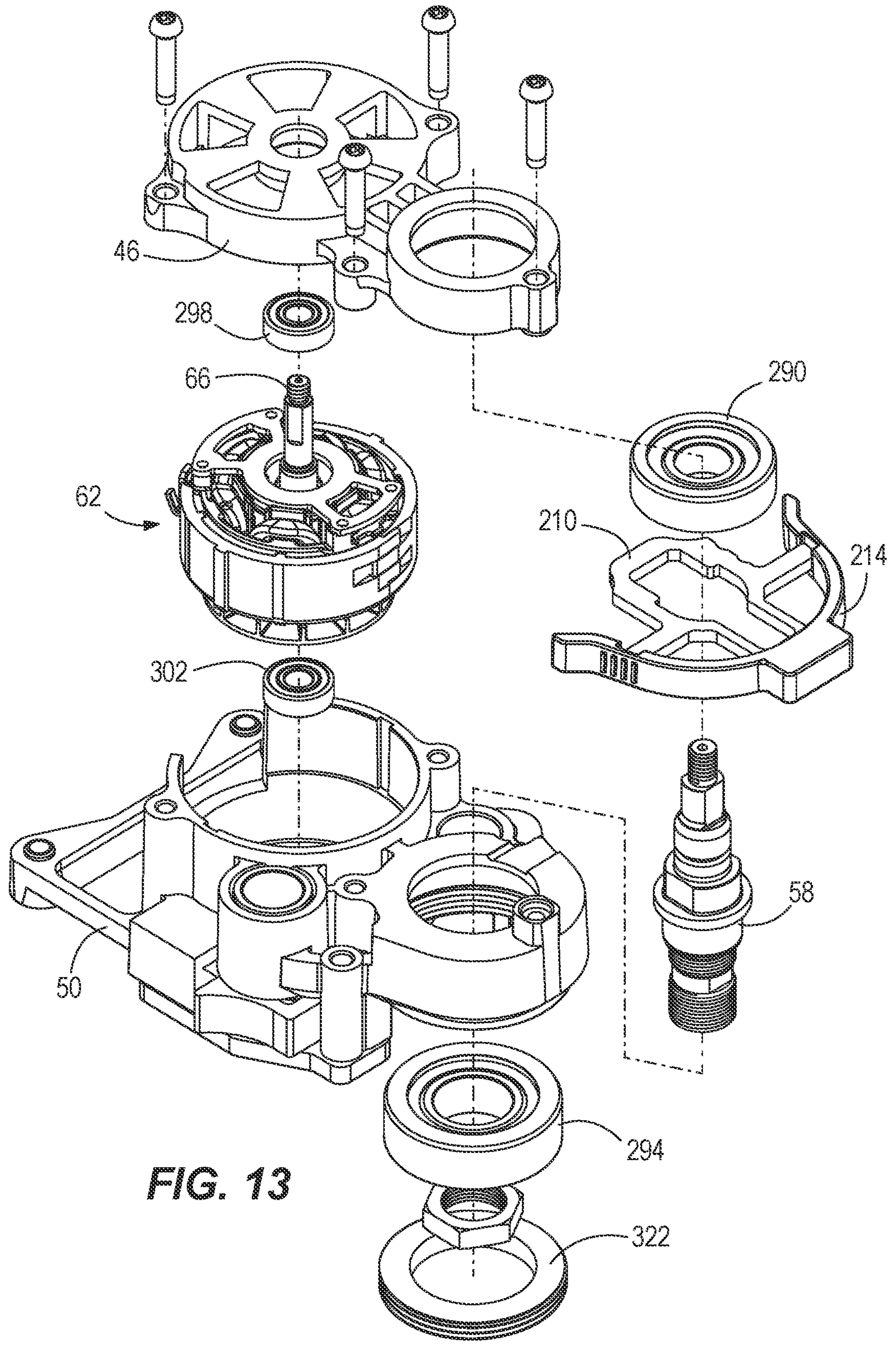
FIG. 13 illustrates an exploded view of the router of FIG. 1 with some components removed showing an upper inner housing and lower inner housing.

With reference to FIGS. 2, 9A, and 9B, the router 10 also includes a spindle lock mechanism 206 operable to selectively prevent rotation of the output shaft 58 so that the cutting tool can be removed from or coupled to the collet assembly 74. The spindle lock mechanism 206 includes a slidable locking plate 210 provided toward the front of the router 10 proximate the output shaft 58 and coupled to a spindle lock actuator 214. In the illustrated embodiment, the spindle lock actuator 214 has two ribbed gripping regions 218, 222, but any number of gripping regions could be provided on the spindle lock actuator 214. The locking plate 210 is slidably disposed between the upper inner housing 46 and the lower inner housing 50. The locking plate 210 defines a central elongated slot 226 through which the output shaft 58 passes, such that the locking plate 210 surrounds the output shaft 58. The elongated slot 226 includes a narrow end 230, a central enlarged region 234, and a locking end 238. The locking end 238 is defined by a non-circular inner shape 242 of the locking plate 210 that selectively mates with a corresponding non-circular outer shape 246 defined by the output shaft 58 when the locking plate 210 is moved from an unlocked position shown in FIG. 9A to a locked position shown in FIG. 9B. In the illustrated embodiment, the non-circular inner shape 242 comprises an opposed pair of first flats 250 and the non-circular outer shape 246 comprises a pair of second flats 254 that are sized to slidably engage with the pair of first flats 250 to prevent rotation of the output shaft 58. However, in other embodiments (not shown) other shapes are also contemplated for the non-circular inner shape and the non-circular outer shape, including hexagons, stars, and more. In fact, the non-circular outer shape could even be provided on the locking plate 210, and the non-circular inner shape could be provided in the output shaft 58 such that when the spindle lock mechanism 206 is actuated by the user, the non-circular outer shape on the locking plate 210 engages with the non-circular inner shape in the output shaft 58 in order to lock the output shaft 58.

In the illustrated embodiment, the locking plate 210 is movable by the operator, via the spindle lock actuator 214, between the first, unlocked position (FIG. 9A) in which the enlarged region 234 of the elongated slot 226 surrounds the output shaft 58 and the flats 250, 254 are not engaged, and the second, locked position (FIG. 9B) in which the locking end 238 of the elongated slot 226 surrounds the output shaft 58 and the flats 250, 254 engage one another to prevent the output shaft 58 from rotating. A post 258 extends from the lower inner housing 50 into the narrow end 230 of the elongated slot 226. The post 258 guides the sliding movement of the locking plate 210 and provides an anchor to resist rotation of the locking plate 210 when the output shaft 58 applies a torque to the locking plate 210.

When the locking plate 210 is located in the unlocked position, the output shaft 58 may spin freely and is not prevented by rotating by the spindle lock mechanism 206. When the spindle lock actuator 214 is moved from the unlocked direction to the locked position, the locking plate 210 engages with the output shaft 58 to prevent the output shaft 58 from rotating. In the illustrated embodiment, the spindle lock actuator 214 partially surrounds the locking plate 210. The locking plate 210 defines two adjacent detent recesses including an unlocked recess 262 and a locked recess 266. A detent spring 270 is housed, in the illustrated embodiment, in a detent spring recess 274 defined in the second clamshell half 42 and biases a detent member 278 towards engagement with the unlocked recess 262 or in the locked recess 266 depending on the position of the spindle lock mechanism 206.

The user can move the spindle lock mechanism 206 from the unlocked position shown in FIG. 9A to the locked position as shown in FIG. 9B by pulling the spindle lock actuator 214 outwardly from the outer housing 30 along a longitudinal direction of the router 10. This motion automatically disengages the detent member 278 from the unlocked recess 262 and reengages the detent member 278 in the locked recess 266 when the user has moved the spindle lock actuator 214 a sufficient distance. The detent member 278 provisionally secures the locking plate 210 in each of the unlocked and locked positions, as desired, which allows the user to operate the spindle lock mechanism 206 hands-free and change the cutting tool without having to hold onto the spindle lock mechanism 206.

With reference to FIGS. 6 and 10-13, the drive assembly 54 also includes a first pulley 282 coupled to the motor shaft 66 and a second pulley 286 coupled to the output shaft 58. The drive belt 70 engages the first and second pulleys 282, 286 to transmit torque from the motor shaft 66 to the output shaft 58. The output shaft 58 is supported by an upper spindle bearing 290 and a lower spindle bearing 294. The motor shaft 66 is similarly supported by an upper motor bearing 298 and a lower motor bearing 302. The upper inner housing 46 defines an upper spindle bearing pocket 306 that receives the upper spindle bearing 290) and an upper motor bearing pocket 310 that receives the upper motor bearing 298 (e.g., by press fit). The lower inner housing 50 defines a lower spindle bearing pocket 314 that receives the lower spindle bearing 294 and a lower motor bearing pocket 318 that receives the lower motor bearing 302. In the illustrated embodiment, the upper spindle bearing pocket 306, the upper motor bearing pocket 310, and the lower motor bearing pocket 318 each open inward, i.e., toward an interior of the assembled inner housing 34. The lower spindle bearing pocket 314, however, opens outward, i.e., toward an exterior of the inner housing 34. A threaded bearing nut 322 secures the lower spindle bearing 294 within the lower spindle bearing pocket 314.

In the illustrated embodiment, the upper inner housing 46 and the lower inner housing 50 are fastened together by screws, but any number of fastening methods may be used. The lower inner housing 50 is further fastened to the outer housing 30 via screws to provide the housing assembly 26. The lower inner housing 50 largely surrounds and protects the motor 62. The lower inner housing 50 also holds the sliding member 102 in place as discussed above. The upper inner housing 46 defines a plurality of airflow openings 326 extending radially from the axis of rotation 330 of the motor 62, but these airflow openings 326 could have a variety of shapes, including concentric rings.

Although the disclosure has been described in detail with reference to certain preferred embodiments, variations and modifications exist within the scope and spirit of one or more independent aspects of the disclosure as described.

What is claimed is:

1. A router comprising:

a motor unit including an electric motor and a rotatable output shaft;

a base plate coupled to the motor unit; and a depth adjustment mechanism configured to adjust a position of the motor unit relative to the base plate, the depth adjustment mechanism including a threaded depth adjustment shaft rotatably coupled to one of the motor unit and the base plate and translationally affixed thereto, and a micro depth adjustment shaft rotatably coupled to the other of the motor unit and the base plate and translationally affixed thereto, the micro depth adjustment shaft being received into a keyed bore defined in the threaded depth adjustment shaft in a telescoping arrangement;

wherein rotation of the micro depth adjustment shaft rotates the threaded depth adjustment shaft to effect movement of the motor unit relative to the base plate.

2. The router of claim 1, wherein the depth adjustment mechanism further comprises a macro depth adjustment actuator supported on the other of the motor unit and the base plate and having meshing threads configured to threadably engage the threaded depth adjustment shaft.

3. The router of claim 2, wherein the meshing threads of the macro depth adjustment actuator engage the threaded depth adjustment shaft to secure a position of the motor unit relative to the base plate.

4. The router of claim 3, wherein the macro depth adjustment actuator is movable between an engaged position in which the meshing threads engage the threaded depth adjustment shaft, and a disengaged position in which the meshing threads do not engage the threaded depth adjustment shaft.

5. The router of claim 4, wherein the motor unit is manually translatable relative to the base plate by pressing the motor unit toward the base plate while the macro depth adjustment actuator is in the disengaged position.

6. The router of claim 2, wherein the threaded depth adjustment shaft is rotatably supported on the base plate, the micro depth adjustment shaft is rotatably supported on the motor unit, and the macro depth adjustment actuator is supported on the motor unit.

7. The router of claim 1, wherein the depth adjustment mechanism further comprises a micro depth adjustment actuator affixed to the micro depth adjustment shaft and rotatable to rotate the threaded depth adjustment shaft.

8. The router of claim 1, wherein rotation of the micro depth adjustment shaft causes the threaded depth adjustment shaft to translate relative to the micro depth adjustment shaft.

9. The router of claim 1, further comprising:

a housing assembly;

the rotatable output shaft coupled to the electric motor and defining a non-circular outer shape; and a spindle lock mechanism configured to selectively prevent rotation of the output shaft, the spindle lock mechanism including a locking plate at least partially surrounding the output shaft and including a non-circular inner shape corresponding to the non-circular outer shape, a spindle lock actuator configured to move the locking plate between a locked position in which the locking plate engages the non-circular outer shape of the output shaft, and an unlocked position in which the locking plate is disengaged from the non-circular outer shape of the output shaft, and a detent member slidably supported on the housing assembly and biased toward the locking plate;

wherein when the locking plate is in the locked position, the detent member engages a detent recess defined in the locking plate to provisionally secure the locking plate in the locked position.

10. The router of claim 9, wherein the detent recess is a first detent recess and the locking plate further defines a second detent recess engageable with the detent member to provisionally secure the locking plate in the unlocked position.

11. The router of claim 9, wherein the locking plate defines a central elongated slot through which the output shaft passes.

12. The router of claim 11, wherein:

the central elongated slot includes a narrow end, a locking end, and a central enlarged region located between the narrow end and the locking end;

the housing assembly includes an outer housing and an inner housing affixed to the outer housing and at least partially surrounded by the outer housing; and the inner housing includes a post that extends into the narrow end 230 of the elongated slot, the post being configured to guide the locking plate when the locking plate is moved between the locked position and the unlocked position.

13. The router of claim 12, wherein the inner housing includes an upper inner housing affixed to a lower inner housing, and wherein the locking plate is slidably disposed between the upper inner housing and the lower inner housing.

14. The router of claim 12, wherein the locking end is defined by the non-circular inner shape.

15. The router of claim 9, wherein the spindle lock actuator includes a first side, a second side located opposite from the first side, a first ribbed gripping region provided on the first side, and a second ribbed gripping region provided on the second side.

16. The router of claim 1, further comprising:

the motor unit movably coupled to the base plate, the motor unit including an outer housing, an inner housing affixed to the outer housing and at least partially surrounded by the outer housing, and a drive assembly supported within the inner housing, the inner housing including an upper inner housing affixed to a lower inner housing, the drive assembly including the electric motor configured to rotate a motor shaft, the rotatable output shaft extending parallel to the motor shaft and configured to receive a torque from the motor shaft, an upper motor bearing supported by the upper inner housing and at least partially supporting the motor shaft, a lower motor bearing supported by the lower inner housing at least partially supporting the motor shaft, an upper spindle bearing supported by the upper inner housing and at least partially supporting the output shaft, and a lower spindle bearing supported by the upper inner housing and at least partially supporting the output shaft.

17. The router of claim 16, wherein the drive assembly further includes a first pulley coupled to the motor shaft, a second pulley coupled to the output shaft, and a drive belt engaging the first pulley and the second pulley.

18. The router of claim 16, wherein the output shaft is further configured to support a tool bit.

19. The router of claim 16, wherein the upper inner housing defines an upper spindle bearing pocket that receives the upper spindle bearing and an upper motor bearing pocket that receives the upper motor bearing, and wherein the lower inner housing defines a lower spindle bearing pocket that supports the lower spindle bearing and a lower motor bearing pocket that receives the lower motor bearing.

20. The router of claim 16, wherein the motor is positioned between the upper inner housing and the lower inner housing.

* * * * *